United States Patent
Tran et al.

(10) Patent No.: US 6,950,400 B1
(45) Date of Patent: Sep. 27, 2005

(54) METHOD AND APPARATUS FOR PERFORMING HIGH-SPEED TRAFFIC SHAPING

(75) Inventors: Christina H. Tran, San Jose, CA (US); Daniel R. Ullum, San Jose, CA (US); Yichou Lin, San Jose, CA (US); Yan-ming Chen, Fremont, CA (US); Silvano Gai, San Jose, CA (US); Thomas J. Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 09/879,553

(22) Filed: Jun. 12, 2001

Related U.S. Application Data

(63) Continuation-in-part of application No. 09/560,499, filed on Apr. 27, 2000.

(51) Int. Cl.[7] .............................................. H04L 12/26
(52) U.S. Cl. ................................... 370/236; 370/395.4
(58) Field of Search ............................ 370/230.1, 236, 370/252, 395.4, 412–428; 709/206; 711/108; 713/502; 365/189.07, 49; 710/37, 60

(56) References Cited

U.S. PATENT DOCUMENTS

| | | | | |
|---|---|---|---|---|
| 5,440,691 A | * | 8/1995 | Carrafiello et al. | 710/60 |
| 5,483,640 A | * | 1/1996 | Isfeld et al. | 710/37 |
| 5,649,110 A | * | 7/1997 | Ben-Nun et al. | 370/416 |
| 5,740,230 A | * | 4/1998 | Vaudreuil | 709/206 |
| 5,781,769 A | * | 7/1998 | Weber | 713/502 |
| 5,805,816 A | * | 9/1998 | Picazo et al. | 370/230 |
| 5,818,815 A | * | 10/1998 | Carpentier et al. | 370/418 |
| 5,995,511 A | * | 11/1999 | Zhou et al. | 370/412 |
| 6,134,217 A | * | 10/2000 | Stiliadis et al. | 370/417 |
| 6,233,243 B1 | * | 5/2001 | Ganmukhi et al. | 370/412 |
| 6,262,989 B1 | * | 7/2001 | Gemar et al. | 370/412 |
| 6,560,230 B1 | * | 5/2003 | Li et al. | 370/412 |

* cited by examiner

Primary Examiner—Duc Ho
Assistant Examiner—Phuongchau Ba Nguyen
(74) Attorney, Agent, or Firm—Cessari and McKenna, LLP

(57) ABSTRACT

A network traffic shaper provides high-speed, multi-level shaping. The traffic shaper is in communicating relationship with a forwarding engine, and includes a queue controller having a plurality of queues for storing messages, a scheduler for computing release times, at least one time-searchable memory and a corresponding memory controller. Each queue is preferably associated with a corresponding traffic specifier, and a release time is computed for each queue and stored in the time-searchable memory. When a stored release time expires, the message at the head of the corresponding queue is retrieved and is either moved into a different queue or forwarded by the network device. By moving messages through two or more queues, each having its own release time computed in response to a different traffic specifier, the traffic shaper can perform multi-level shaping on network messages.

32 Claims, 15 Drawing Sheets

METHOD AND APPARATUS FOR PERFORMING HIGH-SPEED TRAFFIC SHAPING

This application is a continuation-in-part of application Ser. No. 09/560,499 which was filed on Apr. 27, 2000.

BACKGROUND OF THE INVENTION

FIELD OF THE INVENTION

The present invention relates generally to the field of computer networks, and more specifically, to a mechanism for shaping network traffic flows at high speed.

BACKGROUND OF THE INVENTION

Enterprises, including businesses, governments and educational institutions, rely on computer networks to share and exchange information. A computer network typically comprises a plurality of entities interconnected by a communications media. An entity may consist of any device, such as a host or end station, that sources (i.e., transmits) and/or receives network messages over the communications media. A common type of computer network is a local area network ("LAN") which typically refers to a privately owned network within a single building or campus. In many instances, several LANs may be interconnected by point-to-point links, microwave transceivers, satellite hookups, etc. to form a wide area network ("WAN") or subnet that may span an entire city, country or continent. One or more intermediate network devices are often used to couple LANs together and allow the corresponding entities to exchange information. A bridge, for example, may be used to provide a "bridging" function between two or more LANs. Alternatively, a switch may be utilized to provide a "switching" function for transferring information between a plurality of LANs at higher speed. Typically, the bridge or switch is a computer that includes a plurality of ports, which may be coupled to the LANs. The switching function includes receiving data at a source port that originated from a sending entity, and transferring that data to at least one destination port for forwarding to a receiving entity.

Another intermediate network device is called a router. A router is often used to interconnect LANs executing different LAN standards and/or to provide higher level functionality than bridges or switches. To perform these tasks, a router, which also is a computer having a plurality of ports, typically examines the destination address and source address of messages passing through the router. Routers typically operate at the network layer of the communications protocol stack utilized by the network, such as the Internet Protocol (IP) layer of the Transmission Control Protocol/Internet Protocol (TCP/IP) Reference Model. Furthermore, if the LAN standards associated with the source entity and the destination entity are dissimilar (e.g., Ethernet and Token Ring), the router may also alter the format of the packet so that it may be received by the destination entity. Routers also execute one or more routing protocols or algorithms, which are used to determine the paths along which network messages are sent.

To interconnect dispersed computer networks and/or provide Internet connectivity, many organizations rely on the infrastructure and facilities of Internet Service Providers (ISPs) rather than purchase and configure this equipment themselves. ISPs typically own one or more backbone networks that are configured to provide high-speed connection to the Internet. To interconnect private networks that are geographically diverse, an organization may subscribe to one or more ISPs and couple each of its private networks to the ISPs' equipment. Recently, some ISPs have also begun offering web-hosting services. Here, the ISP provides one or more web servers having Internet connectivity to an organization wishing to establish a presence on the Internet or World Wide Web. The organization and ISP typically enter into a service level agreement (SLA) that includes one or more traffic specifiers guaranteeing a level of service from the ISP and/or placing limits on the amount of resources that the subscribing organization will consume for a given charge. For example, an organization may agree that the traffic from its web site will not exceed a certain bandwidth (e.g., 1 Mbps). The ISP then monitors the traffic from the organization's web site to ensure that it complies with the relevant traffic specifiers and is thus "in-profile". Traffic that exceeds the specifier (i.e., traffic that is "out-of-profile") may be policed (i.e., dropped) or shaped (i.e., held until the traffic returns to its specified rate). Alternatively, the out-of-profile traffic may be subject to an accounting change (i.e., charged a higher rate) or marked, but nonetheless allowed to proceed by the ISP. If there is congestion, the ISP may drop such marked traffic first in an effort to relieve the congestion.

The policing and/or shaping of network traffic is typically performed in software by one or more intermediate devices within the ISP's network, such as routers and switches executing the Internetwork Operating System (IOS®) from Cisco Systems, Inc. of San Jose, Calif. First, the intermediate device identifies network messages as belonging to a given traffic flow by examining 5 network and transport layer message parameters (e.g., source and destination IP addresses, source and destination Transmission Control Protocol (TCP) or User Datagram Protocol (UDP) port numbers and transport protocol). For web-hosting services, the ISP is most interested in IP source address and TCP/UDP source port, which are sufficient to associate the traffic flow with a specific web server and site. Based on this information, the software may perform a look-up to identify a corresponding SLA and traffic specifier that applies to this flow. The software also processes the traffic to determine whether it is in or out of profile. If the traffic is in-profile, the software directs the intermediate device to forward it. If the traffic is out-of-profile, the software directs the intermediate device to drop it, buffer it until it is in-profile, or mark it, as provided by the applicable traffic specifier.

With the explosive growth of the Internet and the World Wide Web, some ISPs have begun to host many hundreds of web sites, each generating hundreds if not thousands of traffic flows at any given time. Many ISPs have also started to install and run high-speed equipment, such as fiber optic transmission links and high-speed transmission protocols to boost the performance of their networks. Some equipment, for example, can support Gigabit transmission speeds. In particular, the Institute of Electrical and Electronics Engineers (IEEE) has started development on a new standard, the 802.3z standard, called "Gigabit" Ethernet. This standard is intended to support transmission speeds up to 1000 Mbps (i.e., 1 Gbps). The current software solutions for performing traffic shaping are becoming less efficient at performing their message processing tasks as transmission rates reach such high speeds. Accordingly, a need has arisen for traffic shaping solutions that are capable of operating efficiently at the high transmission speeds of current and future ISP equipment.

SUMMARY OF THE INVENTION

Briefly, the invention relates to a network traffic shaper that is designed to perform multi-level shaping. The shaper is preferably implemented at an intermediate network device that includes a forwarding engine and one or more message buffers for temporarily storing messages that are to be forwarded. The traffic shaper, which is in communicating relationship with the forwarding engine, includes a queue controller having a plurality of queues for storing messages, a scheduler for computing release times, at least one time-searchable memory and a corresponding memory controller. Each queue is preferably associated with a corresponding traffic specifier, and a release time is computed for each queue and stored in the time-searchable memory. When a stored release time expires, the message at the head of the corresponding queue is retrieved and is either moved into a different queue or forwarded by the network device. By moving messages through two or more queues, each having its own release time, the traffic shaper can perform multi-level shaping on network messages.

In a further aspect of the invention, a mechanism is provided for preventing a "drifting" error to occur in the computation of release times. In particular, when a stored release time expires and the corresponding message is retrieved from the respective queue, the calculated release time is noted. This calculated release time is then used in the computation of the next release time for this queue. By considering the calculated release time instead of the actual time that a message is dequeued, delays in identifying expired release times cannot accumulate.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
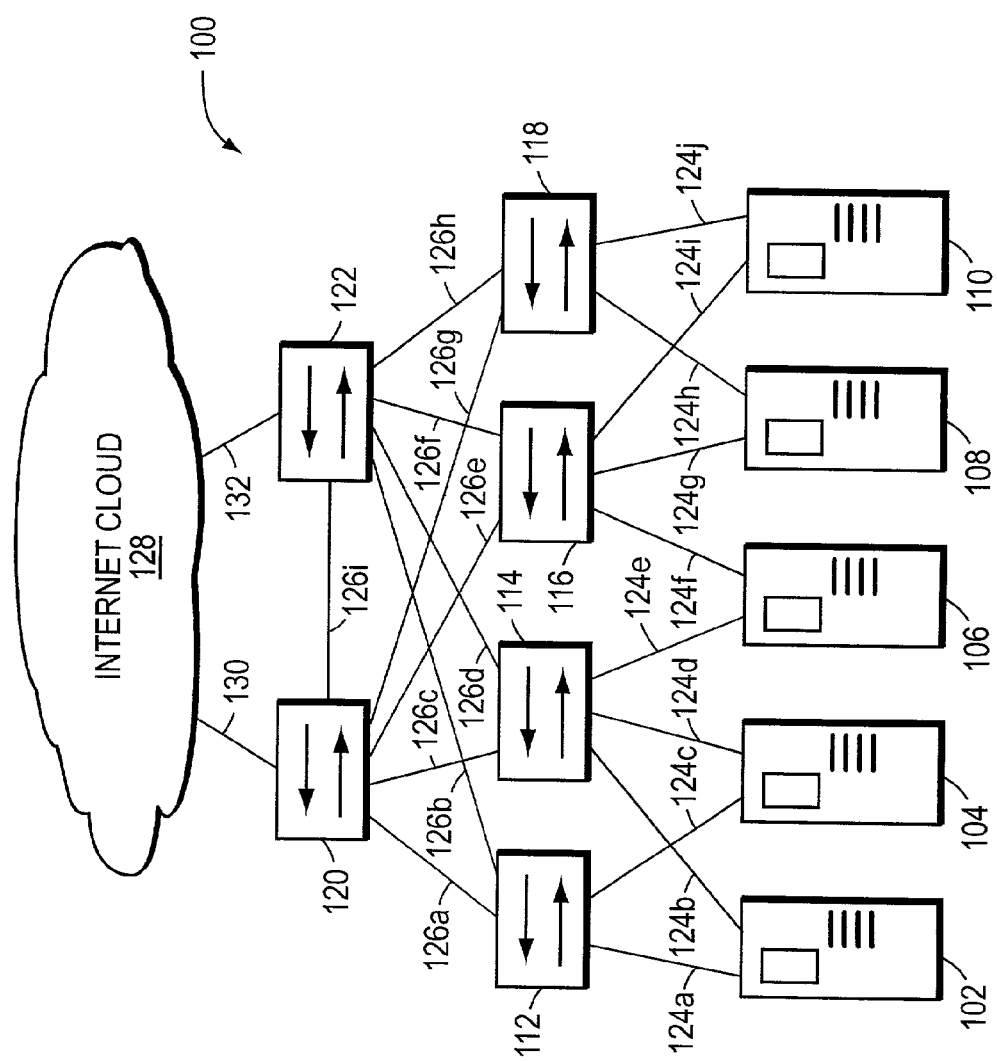
FIG. 1 is a highly schematic block diagram of a computer network.

FIG. 1 is a highly schematic illustration of a computer network 100. The network 100 includes a plurality of servers 102–110 that are preferably configured as web-hosting servers. The network 100 further includes a plurality of intermediate network devices 112–122, such as backbone routers, high-speed switches, etc. Each web server 102–110 is preferably coupled to two or more of the devices 112–122 by respective trunks or links 124a–j. Server 102, for example, is coupled to device 112 by link 124a, and to device 114 by link 124b. The devices 112–122 are similarly interconnected with each other by another set of trunks or links 126a–i. Significantly, the network 100 is also coupled to the well-known Internet, which may be represented by an Internet cloud 128. In particular, device 120 is coupled to the Internet cloud 128 by link 130, and device 122 is coupled to the Internet 128 by link 132. Accordingly, network 100 allows users (not shown) coupled to Internet cloud 128 through other networks or connections to access any of the web servers 102–110 and retrieve information posted on those servers 102–110.

It should be understood that the configuration of network 100 is meant for illustrative purposes only, and that the present invention will operate with other, possibly far more complex, network designs or topologies.

Figure 2:
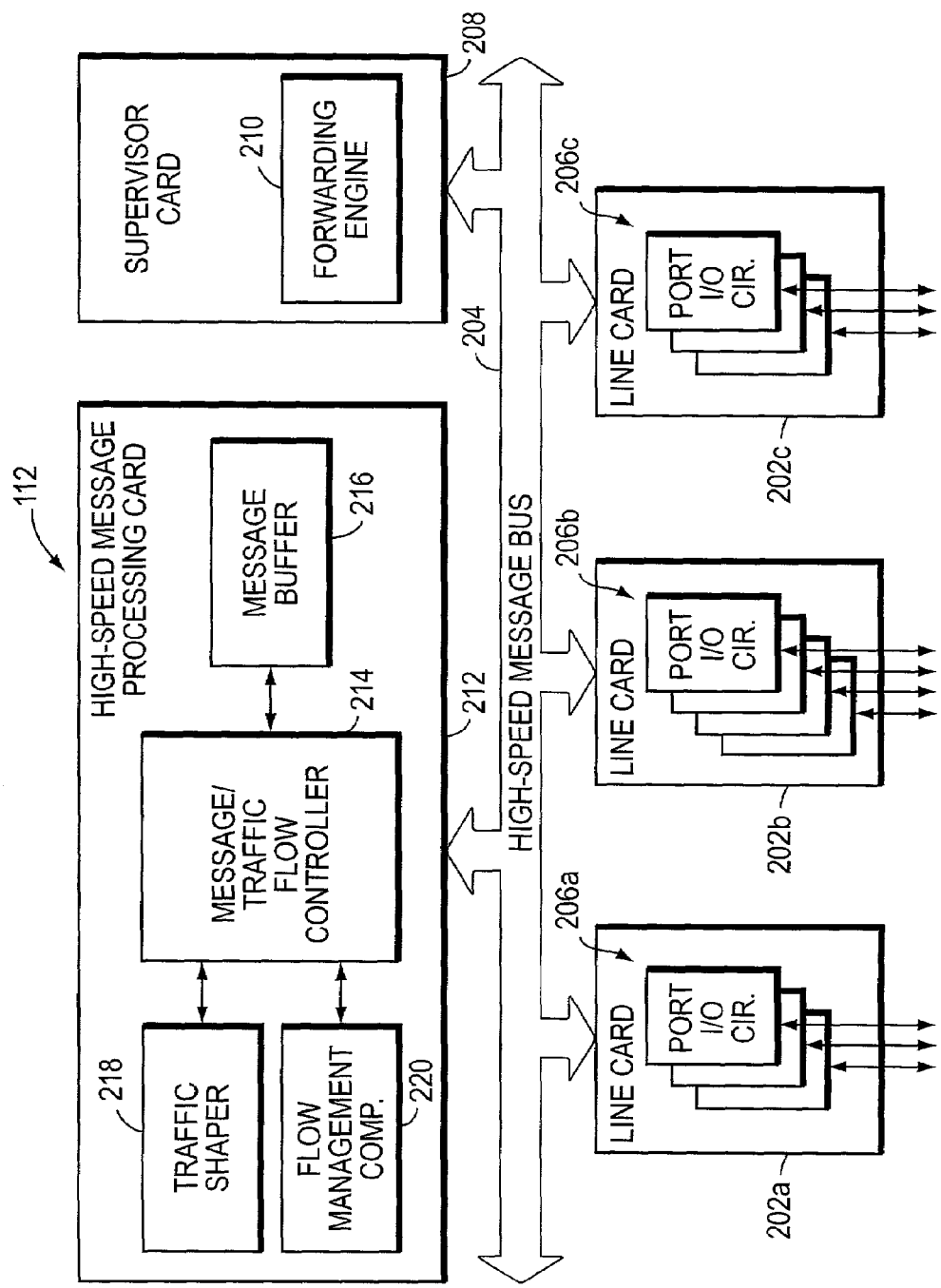
FIG. 2 is a partial functional block diagram of an intermediate network device including a traffic shaper.

FIG. 2 is a highly schematic, partial functional diagram of intermediate network device 112. Device 112 includes a plurality of line cards 202a–202c that are coupled to a high-performance switching bus 204. Each line card 202a–202c, moreover, has a plurality of corresponding port input/output (I/O) circuits 206a–206c, respectively, that are each coupled to respective ports (not shown), thereby connecting device 112 to the entities of network 100 (FIG. 1). The port I/O circuits 206 cooperate with their respective line cards 202a–c to efficiently transmit data to, and receive data from, the switching bus 204. In particular, communication among the various ports or cards occurs synchronously over the switching bus 204 using periodic bus cycles. The switching bus 204, which includes corresponding address and control busses, is preferably a 256-bit bus having a bus cycle of 16 nanoseconds (62.5 Mhz) and an effective data rate of 16 Gigabits per second (Gb/s). Also coupled to switching bus 204 are one or more supervisor cards, such as supervisor card 208, having a forwarding engine 210. The forwarding engine 210 executes forwarding decisions for network messages placed onto the bus 204 and selects one or more destination ports (e.g., port I/O circuits 206) for forwarding those messages.

Each line card 202a–202c also includes its own message buffer (not shown) for temporarily storing messages traversing the bus 204. In addition, a respective buffer circuit (not shown) may be used to connect each line card 202a–c to the switching bus 204. This buffer circuit may be located on the switching bus 204 and provide a single clock (i.e., 40 nanoseconds) delay between the bus 204 and each port on the card 202a–c. Such clock cycle delay maintains proper bus loading so that data transmitted from the ports can be properly driven onto the bus 204.

In addition to the supervisor card 208, device 112 further includes a high-speed message processing card 212 that is similarly coupled to the bus 204. Message processing card 212 preferably includes a message/traffic flow controller 214, a message buffer 216, a traffic shaper 218 and a flow management component 220. The controller 214 includes a clock circuit (not shown) for generating time information. The traffic shaper 218, flow management component 220 and message buffer 216 are each coupled to the message/traffic flow controller 214. In the preferred embodiment, traffic shaper 218 receives and processes pointers to messages temporarily stored at buffer 216.

Suitable intermediate network device platforms for use with the present invention include the commercially available Catalyst 5000 and 6000 series of switches from Cisco Systems, Inc., as well as the intermediate network device described in U.S. patent application Ser. No. 623,142, filed Mar. 28, 1996, for INTERSWITCH LINK MECHANISM FOR CONNECTING HIGH-PERFORMANCE NETWORK SWITCHES, which issued as U.S. Pat. No. 5,742,604, and is hereby incorporated by reference in its entirety.

Figure 3:
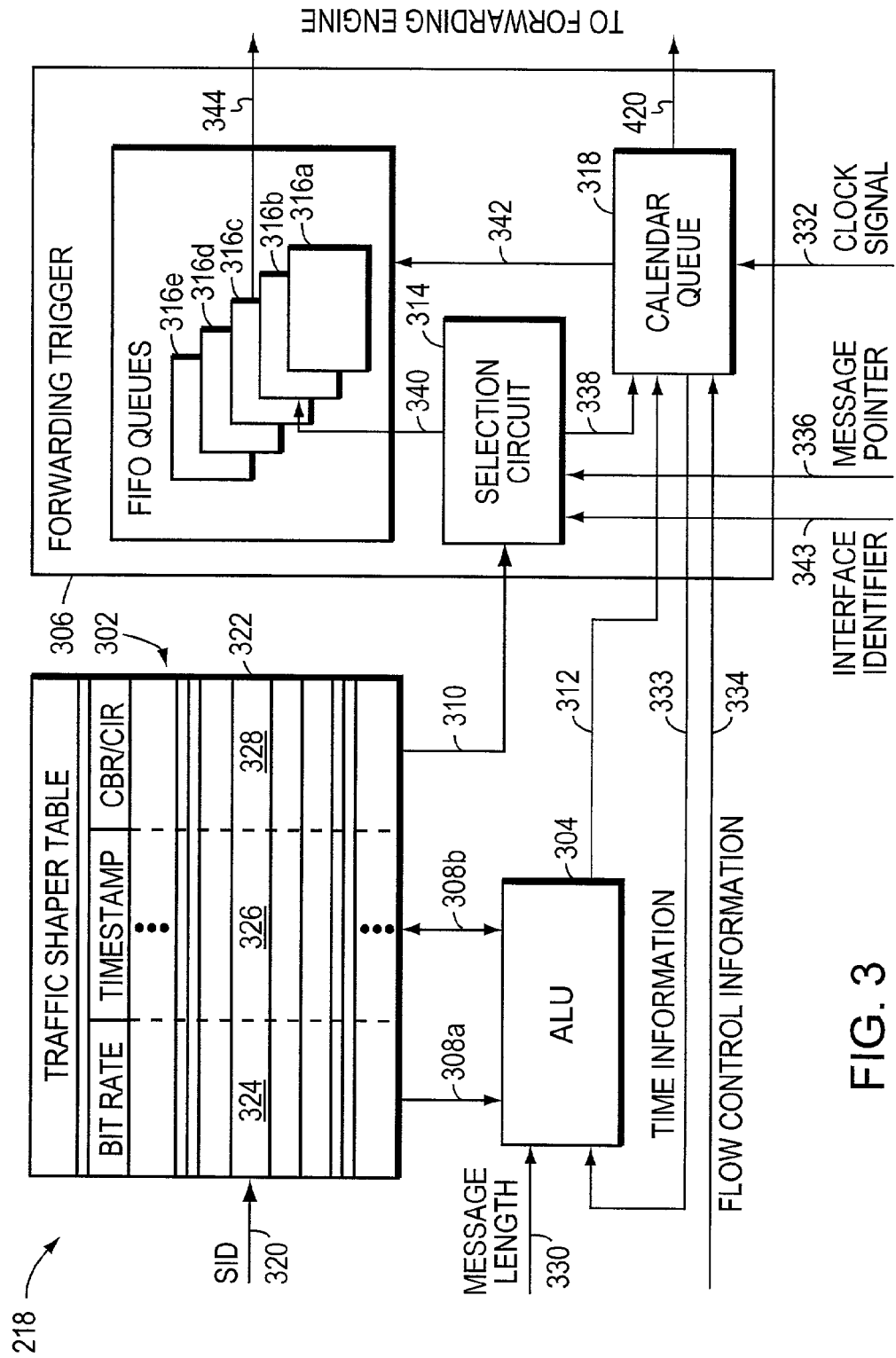
FIG. 3 is a functional block diagram of the traffic shaper of FIG. 2.

FIG. 3 is a high-level schematic block diagram of the traffic shaper 218 of FIG. 2. The traffic shaper 218 includes a traffic shaper table 302, an arithmetic logic unit (ALU) 304, and a high-speed forwarding trigger mechanism 306. The ALU 304, which is configured to compute one or more transmission start times for each designated message, is coupled to the traffic shaper table 302, as shown by arrows 308a and 308b. Both the traffic shaper table 302 and the ALU 304 are coupled to the forwarding trigger mechanism 306, as shown by arrows 310 and 312, respectively. The traffic shaper table 302 may be pre-configured with data transmission rate information for the traffic flows for which the shaper 218 is responsible. In particular, traffic shaper table 302 may be arranged as an array having a plurality of rows or records (e.g., 32 k). Each row of the array has a first field containing at least one data transmission or bit rate (e.g., in bits per second). Each row also has a second field for storing a timestamp that relates to the time that the last message was transmitted at the respective bit rate. Each row may further include a third field for use in signifying whether the row contains a single data transmission rate for performing constant bit rate (CBR) traffic shaping, or two data transmission rates for performing committed information rate/excess information rate (CIR/EIR) traffic shaping.

CBR traffic shaping means that the transmission rate of the respective traffic must not exceed the CBR transmission rate. If messages are received at a rate greater than the rate at which they can be transmitted to remain within the CBR, these additional messages are buffered for later transmission. If the buffer fills, subsequently received messages may be dropped. Although CBR is a relatively straightforward technique, it can be too strict in situations where excess bandwidth may exist. With CIR/EIR traffic shaping, the system guarantees to send the respective traffic at the CIR transmission rate. However, if excess bandwidth exists, the traffic may be sent at the EIR transmission rate which is better (i.e., faster) than the associated CIR rate. If excess bandwidth does not exist, the traffic is simply sent at the guaranteed CIR rate.

The forwarding trigger mechanism 306 includes a plurality of sub-components. In particular, it includes a selection circuit 314, a plurality of first-in-first-out (FIFO) queues 316a–e and a time-searchable queue, such as calendar queue 318. The selection circuit 314 is coupled to receive control information from the traffic shaper table 302, and also to the FIFO queues 316 and the calendar queue 318 for loading or storing information therein. As described below, the FIFO queues 316 are used to implement CIR/EIR traffic shaping, and the calendar queue 318 contains the transmission start times computed by the ALU 304 and determines when a given message may be transmitted by the respective intermediate device, e.g., device 112 (FIG. 2).

Additionally, the traffic shaper table 302, the ALU 304 and the trigger mechanism 306 are also coupled to the message/traffic flow controller 214 (FIG. 2) to receive specific information therefrom. This information may originate from controller 214 or from the forwarding engine 210. In particular, the traffic shaper table 302 is configured to receive a shaper identification (SID), as indicated by arrow 320, for received messages. A SID basically represents the data transmission or bit rate at which the respective message is to be sent. The SID is typically derived by the forwarding engine 210 from one or more traffic specifiers in the service level agreement for the respective message/traffic flow. Each SID also identifies, preferably uniquely, a particular row or record, such as row 322, within table 302. As described above, the row 322, moreover, includes a first field 324 containing one or more data transmission or bit rates, a second field 326 containing one or more last message sent timestamp(s), and a third field 328 signifying whether the respective data transmission rate is for CBR traffic shaping or CIR/EIR traffic shaping.

Message length information, preferably from the forwarding engine 210 (FIG. 2), is provided to the ALU 304, as indicated by arrow 330, and a high frequency clock signal, e.g., a 100 MHz square wave, is provided to the calendar queue 318, as represented by arrow 332. Calendar queue 318 utilizes this clock signal to operate a system time generator as described below. This system time information is provided by calendar queue 318 to the ALU through a communication mechanism represented by arrow 333. The ALU 304 uses this length and time information to compute a time at which transmission of the respective message may start in compliance with the SID. This transmission start time is provided to the calendar queue 318 by the communication mechanism represented by arrow 312. The calendar queue 318 also receives flow control information from the message/traffic flow controller 214, as shown by arrow 334. This flow control information may be derived by controller 214 in cooperation with the flow management component 220. The flow control information basically informs the calendar queue 318 whether excess bandwidth exists for sending network messages from the respective device, e.g., device 112. The controller 214 also provides a message pointer to the selection circuit 314 of the forwarding trigger mechanism 306, as indicated by arrow 336. The message pointer specifies the particular location in the message buffer 216 at which the respective message is stored.

The selection circuit 314 of the forwarding trigger 306 is configured and arranged to supply the message pointer information either to the calendar queue 318 or to the FIFO queues 316, as shown by arrows 338 and 340, respectively, depending on the type of traffic shaping to be applied as specified by table 302 via arrow 310. In addition, the calendar queue 318 is coupled to the FIFO queues 316, as shown by arrow 342. Selection circuit 314 may further receive interface identifier information from controller 214 through a communication mechanism represented by arrow 343. As described below, circuit 314 may utilize this interface information to select a particular FIFO queue 316.

Figure 4:
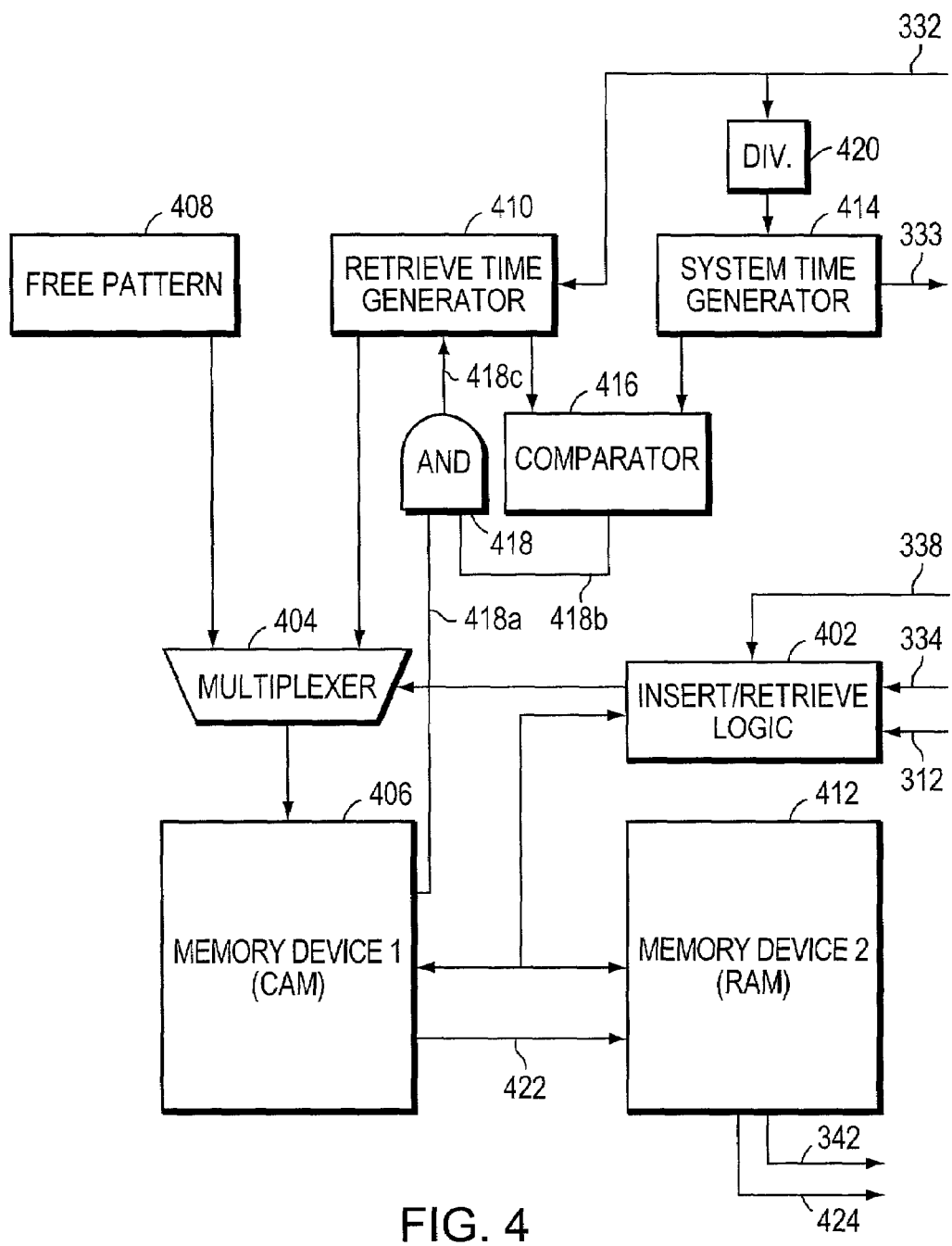
FIG. 4 is a functional block diagram of the time-searchable queue of the traffic shaper of FIG. 2.

FIG. 4 is a functional block diagram of the calendar queue 318. The calendar queue 318 includes insert/retrieve logic 402 that is operatively coupled to control a multiplexer 404 having an output coupled to a first memory device 406. The multiplexer 404 is configured to receive inputs from a free pattern data structure 408 and a retrieve time generator 410. The calendar queue 318 further includes a second memory device 412, that is related to the first memory device 406, and a system time generator 414. The insert/retrieve logic 402, in addition to controlling the multiplexer 404, is also coupled to both the first and second memory devices 406, 412 for storing information in the respective entries thereof, and also for retrieving information and outputs therefrom. The calendar queue 318 also includes a comparator 416 and Boolean logic configured as, e.g., an AND gate 418. The comparator 416 receives inputs from the retrieve time generator 410 and the system time generator 414. The AND gate 418 has two inputs 418a and 418b and one output 418c. The first input 418a is coupled to the first memory device 406, while the second input 418b is coupled to an output of the comparator 416. The output 418c of the AND gate 418 is coupled to the retrieve time generator 410.

As described above, the calendar queue 318 receives various information from the other components of the forwarding trigger 306, the traffic shaper 218 and the message/traffic flow controller 214 (FIG. 2). In particular, a clock signal is provided as represented by arrow 332 to both the retrieve time generator 410 and the system time generator 414 for use in operating (e.g., incrementing) those generators. A divider circuit 420 is preferably interposed between the clock signal 332 and the system time generator 414 to alter the rate at which the system time generator 414 is advanced. For example, the divider circuit 420 may modify the clock signal 332 (e.g., 100 MHz) so that the resolution or granularity of the system time generator 414 is 100 nanoseconds (nsec). System time as determined by generator 414, moreover, is preferably provided to the ALU 304 (FIG. 3) as indicated by arrow 333. Retrieve and system time generators 410, 414 may each include a 32-bit register for storing their respective times.

The flow control information from arrow 312 is received at the insert/retrieve logic 402. Communication signals from the selection circuit 314 (FIG. 3), as represented by arrow 338, are received at the insert/retrieve logic 402, and information from the second memory device 412 may be provided to the FIFO queues 316 (FIG. 2) as indicated by arrow 342.

In the preferred embodiment, the traffic shaper of the present invention is implemented in hardware through a plurality of registers and combinational logic configured to produce sequential logic circuits and cooperating state machines. For example, the first memory device 406 is preferably implemented via an associative memory or content addressable memory (CAM) device, such as a ternary content addressable memory (TCAM), whose cells (not shown) may be associated with or assigned one of three values, such as "0", "1" or "don't care". Suitable TCAMs for use with the present invention are commercially available from NetLogic Microsystems, Inc. of Mountain View, Calif. and Music Semiconductors of Hackettstown, N.J. A preferred TCAM has 512K rows of 72 bit length. To implement the "don't care" value, the TCAM 406 may be segregated into blocks of cells (each cell being either asserted or de-asserted) such that each block has a corresponding mask that determines whether the respective cells of its block are "care" or "don't care". It should also be understood that one or more binary CAMs may be used. The second memory device 412 is preferably implemented via a static or dynamic random access memory (RAM) structure. Those skilled in the art will recognize that other combinations of hardware components in addition to those specifically described herein may be advantageously utilized to achieve the objectives of the present invention.

Operation of the traffic shaper 218 proceeds as follows. Suppose web server 102 (FIG. 1) hosts a plurality of websites, and that a user coupled to the Internet cloud 128 connects to one of these sites (e.g., website "ABC") and requests information. Suppose further that the ISP running network 100 and the owner of website "ABC" have entered into a service level agreement (SLA) in which the ISP guarantees a particular data transmission rate (e.g., 1 Mbps) and website "ABC" agrees not to exceed that rate. In response to the user connection, the website "ABC" generates one or more network messages for transmission to the user. These network messages are then handed to conventional network communications facilities (not shown) at the web server 102 where they are encapsulated into one or more packets and/or frames, such as Transmission Control Protocol/Internet Protocol (TCP/IP) packets. These packets are then transmitted across link 124a and received at device 112. At device 112, the packets are initially captured by the port I/O circuit 206 that is coupled to link 124a. The respective line card, e.g., card 202a, then drives the packets onto the high-speed bus 204. From here, the packets are received by the other line cards 202b and 202c, the message processing card 212 and the supervisor card 210. Message processing card 212 temporarily stores the packets in its message buffer 216 as do the other line cards 202b and 202c, while forwarding engine 210 executes a forwarding decision.

In general, forwarding engine 210 examines one or more fields of the packet (e.g., source and destination IP addresses, source and destination TCP/UDP port numbers, transport protocol, etc.) and determines whether the packet should be shaped. Since the packet originated from website "ABC" at web server 102, which is subject to an SLA, forwarding engine 210 concludes that it should be shaped. Accordingly, the forwarding engine 210 identifies the shaper identification (SID) to which such packets are subject under the terms of the SLA, and provides the SID along with other packet-related information, as described below, to the message processing card 212 for forwarding to the traffic shaper 218. Shaper 218, in turn, calculates when the packet may be sent in compliance with the SID. The other line cards 202b and 202c simply discard the packet from their message buffers. When the calculated transmission start time is reached, the traffic shaper 218 notifies the message/traffic flow controller 214 which retrieves the packet from the message buffer 216 and places it once again on the bus 204 where it is received by all of line cards 202a–c and stored in their respective message buffers. The packet is also received by the forwarding engine 210 of the supervisor card. Since the packet originated from the message processing card 212, rather than a line card 202, the forwarding engine 210 "knows" that it has already been shaped. Accordingly, this time the forwarding engine 210 determines the line card 202 and port I/O circuit 206 from which the packet should be forwarded, based on the packet's destination address, and instructs this line card and port I/O circuit to forward the packet. The other line cards 202 simply discard the packet from their buffers.

As described herein, one of the key attributes of the novel traffic shaper 218 is its ability to render such per-packet transmission time calculations fast enough to support Gigabit transmission speeds by forwarding engine 210 and intermediate device 112, despite the fact that messages may traverse bus 204 twice.

To determine the SID, forwarding engine 210 may perform a look-up on a memory structure (not shown) that associates messages (e.g., by IP source address and TCP/UDP source port) with their corresponding SIDs. The identified SID is then passed to the message processing card 212 and handed to the traffic shaper 218 by the controller 214 as indicated by arrow 320 (FIG. 3). Forwarding engine 210 or controller 214 also determines the length of the message (e.g., in bits or octets) and provides this information to the traffic shaper 218 as indicated by arrow 330. Controller 214 also hands the traffic shaper 218 a pointer as indicated by arrow 336 that identifies where in message buffer 216 the respective message has been temporarily stored. The SID, message length and message pointer for a given message are all preferably provided to the traffic shaper 218 at substantially the same time (e.g., in parallel), thereby allowing shaper 28 to coordinate this information for each message.

The SID from forwarding engine 210 is used by the traffic shaper 218 to identify a particular row or record (e.g., row 322) of traffic shaper table 302. The data transmission rate(s) and timestamp(s) contained in the corresponding fields 324 and 326 of this row 322 are then provided to the ALU 304 as indicated by arrows 308a and 308b. Using this information, together with the message length received via arrow 330, the ALU 304 computes one or more transmission start times. That is, based on the length of the message from arrow 330, the transmission rate from arrow 308a and the last time a message was sent at this transmission rate from arrow 308b, the ALU 304 can compute when this message may be sent in compliance with the identified transmission rate. If two or more bit rates are provided to the ALU 304 via arrow 308a (e.g., in the case of CIR/EIR traffic shaping), the ALU 304 calculates a transmission start time for each such bit rate. The one or more transmission start times, which may be 32-bit values like the corresponding time registers operated by generators 410 and 414 (FIG. 4), are then provided by the ALU 304 to the calendar queue 318 via arrow 312. The ALU 304 also returns the computed transmission start time(s) to the traffic shaper table 302 for up-dating (i.e., re-writing) the last message sent timestamp field 326 of the respective SID, as indicated by arrow 308b. It should be understood that ALU 304 may also store message length in table 302 (in its own field or column).

In a preferred embodiment, rather than containing one or more bit rates, first field 324 of the identified record contains information for use in implementing a token bucket mechanism. Token bucket refers to a packet transfer technology that accommodates burstiness. Conceptually, one or more tokens are required to forward network messages. Tokens are acquired at a certain rate and are placed in a "bucket". Once the bucket is full, any additional tokens are simply discarded. As traffic is received, if sufficient tokens are present in the bucket, the traffic may be forwarded, causing the requisite number of tokens to be "consumed". If insufficient tokens are present, the traffic must be delayed (i.e., placed in a buffer) until more tokens are received. Thus, the token bucket scheme accommodates burstiness, but ensures that the long-term transmission rate does not exceed the established rate at which tokens are placed in the bucket. The three parameters used to set-up a token bucket scheme are burst size, mean rate and measurement (or time) interval. Thus field 324, which may be divided into one or more sub-fields, is preferably configured to contain this information.

The information contained in field 328 of the identified row 322 specifying whether the SID calls for CBR or CIR/EIR traffic shaping is provided to the selection circuit 314 via arrow 310. The selection circuit 314 uses this information to determine whether the message pointer received via arrow 336 should be stored in the FIFO queues 316 or in the calendar queue 318. In particular, if CBR traffic shaping is requested as reflected by the contents of field 328, the selection circuit 314 passes the message pointer to the calendar queue 318 for storage, whereas if CIR/EIR traffic shaping is requested, the selection circuit 314 places the message pointer in one of the FIFO queues (e.g., FIFO queue 316b) and supplies the calendar queue 318 with the identity of the selected FIFO queue 316b. At FIFO queue 316b, the message pointer is placed at the end of the queue.

In one embodiment, the FIFO queues 316 of the forwarding trigger 306 are associated with different levels of service. For example, each FIFO queue may be associated with a differentiated service (DS) codepoint, as defined by a working group of the Internet Engineering Task Force (IETF) in a document entitled *An Architecture for Differentiated Services*. Messages carry a particular DS codepoint in order to specify the per-hop behavior (e.g., expedited forwarding, assured forwarding, etc.) that is to be applied to the message. Since the IETF plans to define 64 DS codepoints, forwarding trigger 306 preferably includes 64 FIFO queues 316, one per DS codepoint.

In another embodiment, the forwarding trigger 306 has at least one, but preferably two or more, FIFO queues for each network layer (e.g., IP) interface configured at the corresponding intermediate device, e.g., device 112. For example, for each interface, there may be one FIFO queue per Service Level Agreement (SLA). An interface basically represents the logical communication path between adjacent layers of a communication protocol stack, such as the IP and data link layers of the TCP/IP Reference Model. See A. Tanenbaum *Computer Networks* (3rd ed. 1996) at pp. 17–37 for a general description of interfaces. The selection circuit 314 preferably places the message pointer in the FIFO queue that corresponds to the interface and SLA from which the respective message will be sent, as determined by the forwarding engine 210. Circuit 314 may learn of the appropriate FIFO queue through the interface/SLA identifier information received from the flow controller 214 (FIG. 2) as represented by arrow 343.

Nonetheless, it is the calendar queue 318 of the forwarding trigger 306 that permits the transmission start times of network messages to be stored, searched and identified on a high-speed basis. In particular, the insert/retrieve logic 402 receives either the single transmission start time for CBR traffic shaping or two transmission start times for CIR/EIR traffic shaping via arrow 312. Insert/retrieve logic 402 also receives message pointer information (i.e., either the actual message pointer or the identity of the FIFO queue 316 containing the actual message pointer) from the selection circuit 314. In response to receiving such information, the insert/retrieve logic 402 sets the multiplexer 404 to search TCAM 406 for the first instance of the free pattern as identified from free pattern data structure 408 (i.e., calendar queue 318 is operating in "insert" mode). Preferably, the TCAM 406 is initially configured so that every entry corresponds to the free pattern (e.g., 1000 . . . 000). As data is loaded into the TCAM 406, the values of the corresponding entries will no longer match the free pattern indicating that these entries now contain data and should not be overwritten.

With the input to the TCAM 406 set to the free pattern 408, it preferably returns the first entry that matches the free pattern. So as to provide greater storage capacity than otherwise possible with currently available TCAMs, the output of each TCAM entry is preferably configured to identify a particular entry or location in the second memory device 412, as represented by arrow 422. The insert/retrieve logic 402 stores the received information for the respective message in the identified entry of the first and second memories 406, 412. In particular, the insert/retrieve logic 402 stores the tuple {Pointer, First Timestamp, Second Timestamp}, where Pointer corresponds to the message pointer information (i.e., a location in buffer 216 or the identity of a particular FIFO queue 316), and the First and Second Timestamps correspond to the computed transmission start times for the corresponding message. In particular, for CBR traffic shaping, both the First and Second Timestamps are set to the single computed transmission start time. For CIR/EIR traffic shaping, the First Timestamp is set to the CIR computed transmission start time and the Second Timestamp is set to the EIR computed transmission start time. The two timestamps are stored in the free entry of the TCAM 406 and the message pointer information is stored in the corresponding entry of the RAM 412. The calendar queue 318 repeats this process for each network message to be shaped, loading up the free entries of the TCAM 406 with the two transmission start times and the matching entries of the RAM 412 with the corresponding message pointer information.

It should be understood that the combination of TCAM 406 and RAM 412 could be replaced with just one TCAM (or several TCAMs) of sufficient width to additionally store the information otherwise held by RAM 412.

In addition to loading the first and second memory devices 406 and 412 with message transmission and location information, the calendar queue 318 also searches the first memory device 406 for messages that may be transmitted based on their transmission start times. To identify messages that may be sent, the calendar queue 318 preferably uses the retrieve time generator 410, rather than making transmission decisions based solely on the system time. In particular, the calendar queue 318 searches the TCAM 406 for messages whose transmission start time matches the current retrieve time as determined by the retrieve time generator 410. To set the TCAM 406 to search for messages as opposed to locating free entries, the insert/retrieve logic 402 preferably couples the output of the multiplexer 404 to the retrieve time generator 410 (i.e., calendar queue 318 is operating in "retrieve" mode).

In retrieve mode, the TCAM 406 is searched for all entries having a transmission start time that matches the value of the retrieve time generator 410. When such an entry is found, the calendar queue 306 triggers the message/traffic flow controller 214 to fetch the message from buffer 216 as identified by the location information from the corresponding entry in the second memory device 412, and place the message on bus 204. More specifically, the insert/retrieve logic 402 first determines whether or not excess bandwidth exists for the transmission of messages. Insert/retrieve logic 402 preferably receives this information from the controller 214 via arrow 334. If excess bandwidth exists, the insert/retrieve logic 402 searches the TCAM 406 for all entries whose Second Timestamp value matches the retrieve time. When such an entry is found, the insert/retrieve logic 402 determines whether the information from the corresponding entry in the RAM 412 is a pointer to a location in the message buffer 216 (FIG. 2) or to one of the FIFO queues 316. If the information is a pointer to message buffer 216, then the calendar queue 318 "knows" that CBR traffic shaping was implemented for this message. In response, the calendar queue 318 issues a transmit trigger-signal to the message/traffic flow controller 214, as indicated by arrow 424 from RAM 412. This transmit trigger-signal includes the pointer to message buffer 216. The controller 214, in turn, retrieves the identified message from buffer 216 (using the pointer returned by the traffic shaper 218) and places the message on the high-speed bus 204 for forwarding by the appropriate destination port, as determined by the forwarding engine 210.

If the information from the corresponding location in RAM 412 identifies one of the FIFO queues 316, then the calendar queue 318 "knows" that CIR/EIR traffic shaping was requested. In response, the calendar queue 318 accesses the identified FIFO queue (e.g., FIFO queue 316c), as indicated by arrow 342, and directs queue 316c to issue a transmit trigger-signal to the message/traffic flow controller 214, as shown by arrow 344 (FIG. 3). This transmit trigger-signal includes the pointer stored at the head of queue 316c which identifies the next message to be sent from that queue. The controller 214 similarly retrieves the identified message from buffer 216 and places the message on the high-speed bus 204 for forwarding by the appropriate destination port. Queue 316c then deletes (i.e., de-queues) this entry and advances all of the remaining pointers.

The searching of the TCAM 406 continues for all entries whose Second Timestamps match the current value of the retrieve time generator 410. For each matching entry, the TCAM 406 identifies a corresponding location in the RAM 412 as reflected by arrow 422, and the calendar queue 318 uses the contents of this memory location to issue a transmit trigger-signal to the controller 214. Upon identifying each matching entry and identifying its corresponding location in the second memory device 412, the entry at TCAM 406 is re-set to the free pattern so that it may be re-used by the insert/retrieve logic 402 during insert mode. This process continues until all TCAM entries matching the current value of the retrieve time generator 410 have been located and processed or until the insert/retrieve logic 402 receives an indication, via arrow 334, that excess bandwidth no longer exits.

If there is no excess bandwidth, the insert/retrieve logic 402 searches the TCAM 406 for entries whose First Timestamp matches the current retrieve time. As each matching entry is identified, the corresponding message information from the RAM 412 is similarly accessed and a transmit trigger-signal is issued to the message/traffic flow controller 214. To switch searching the TCAM 406 between the First Timestamp entry and the Second Timestamp entry (i.e., between different columns), the insert/retrieve logic 402 preferably employs one or more Global Mask Registers (GMRs). Each GMR masks the fields from one or more columns (i.e., the First Timestamp column or the Second Timestamp column).

The insert/retrieve logic 402 is preferably configured to give precedence to the loading or inserting of new information in the first and second memory devices 406, 412. Thus, only if there is no data to store does the insert/retrieve logic 402 switch to retrieve mode.

Those skilled in the art will understand that other search techniques may be implemented or utilized at the first memory device 406.

As mentioned above, the calendar queue 318 is configured to ensure that the value of the retrieve time generator 410 never exceeds the system time. In addition, the retrieve time generator 410 is blocked from incrementing while matching entries in the first memory device 406 are being located and processed. This operating characteristic is achieved through the combined operation of AND gate 418 and comparator 416. More specifically, the retrieve time generator 410 is configured so that it can only increment when the output of the AND gate 418 is TRUE. One of the inputs to the AND gate 418, moreover, is from the comparator 416, which itself receives inputs from the system time generator 414 and the retrieve time generator 410. If the current retrieve time from generator 410 is less than the system time from generator 414, then the comparator 416 outputs a TRUE signal via line 418b to the AND gate 418. However, before the AND gate 418 will output a TRUE signal and thereby allow the retrieve time generator 410 to increment, it must also receive a TRUE signal on its second input 418a. As indicated above, second input line 418a of AND gate 418 is coupled directly or indirectly to TCAM 406, which provides a TRUE signal only when there are no entries that match the current retrieve time. In other words, TRUE means that there are no entries in the TCAM 406 whose First Timestamp or Second Timestamp (depending on the presence of excess bandwidth) matches the current retrieve time.

If these two conditions are met, then the output of the AND gate 418 is TRUE and the retrieve generator 410 is allowed to increment. Significantly, the retrieve generator 410 is configured to increment at a higher rate than the system time generator 414. In particular, as described above, the clock signal from arrow 332 is subject to a divider circuit 420 before reaching the system time generator 414. No such divider circuit is utilized on the clock signal feeding the retrieve time generator 410. Thus, the retrieve time generator 410 increments or advances at a faster rate than the system time generator 414. Accordingly, the retrieve time, which is stopped while matching entries in first memory device 406 are processed, can quickly "catch-up" to the system time. It should be understood that the TCAM 406 is nonetheless searched for entries matching each new retrieve time as generated by retrieve time generator 410. That is, each time the retrieve time generator 410 is incremented to a new "value", that value is compared against the entries of TCAM 406.

In the preferred embodiment, the system time generator 414 is incremented once every 100 nsec due to the divider circuit 420, while the retrieve time generator 410 increments once every 10 nsec. By incrementing the retrieve generator 410 at a higher rate than the system time generator 414, the retrieve generator 410 can quickly catch-up to the system time specified by generator 414. This is important since, as described above, the retrieve time generator 410 is stopped while matching entries in the TCAM 406 are located and processed, and TCAM 406 is searched for every new value (i.e., every increment) of the retrieve time generator 410. Once the retrieve time generator 410 has caught up to the system time generator 414, the comparator 416 stops outputting a TRUE signal to AND gate 418 and the retrieve time generator 410 stops incrementing.

Those skilled in the art will recognize that other relationships besides 10:1 may possibly be used for the retrieve generator 410.

It should be further understood that for traffic shapers that are only configured to implement CBR traffic shaping, the selection circuit 314 and FIFO queues 316 can be omitted.

Figure 5:
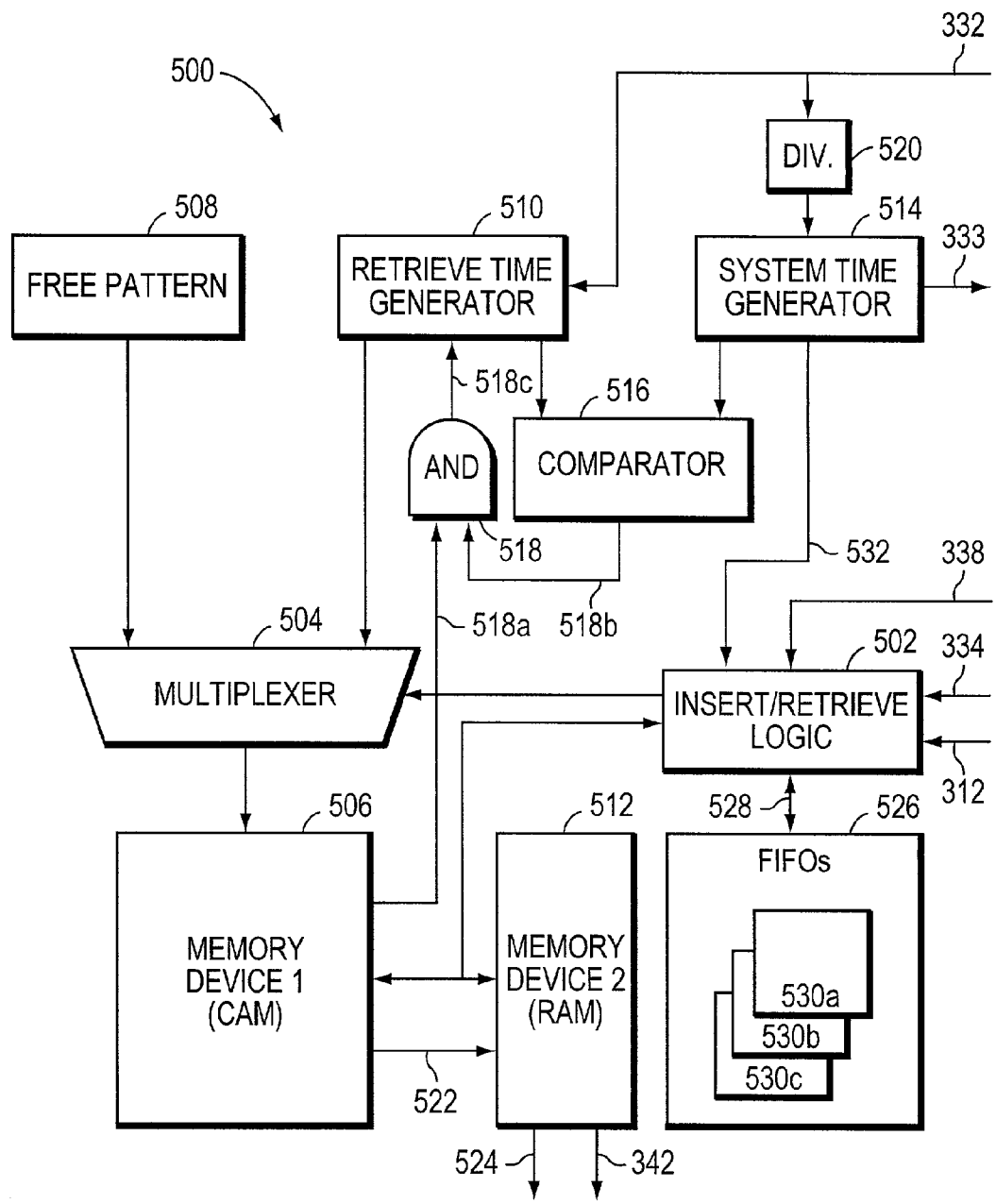
FIG. 5 is a functional block diagram of another embodiment of the time-searchable queue.

FIG. 5 is a schematic drawing of another embodiment of a calendar queue 500. Calendar queue 500, like calendar queue 318 described above, includes insert/retrieve logic 502 which controls a multiplexer 504 having an output coupled to a first memory device (e.g., a TCAM) 506. Multiplexer 504 receives inputs from a free pattern data structure 508 and a retrieve time generator 510. The calendar queue 318 further includes a second memory device (e.g., RAM) 512, which is related to the first memory device 506, as well as a current time generator 514. The insert/retrieve logic 502, in addition to controlling the multiplexer 318, is further coupled to two memory devices 506, 512 for storing information therein, and also for retrieving information and outputs therefrom. The calendar queue 500 also includes a comparator 516 and an AND gate 518. The comparator 516 receives inputs from the retrieve time generator 510 and the current time generator 514. A first input 518*a* of AND gate 518 is coupled to the first memory device 506, while a second input 518*b* is coupled to an output of the comparator 516. An output 518*c* of the AND gate 518 is coupled to the retrieve time generator 510.

To improve performance, calendar queue 500 further includes a temporary data store 526 in which message pointers and start times may be accumulated (e.g., buffered) before being loaded into the TCAM 506 and RAM 512. In the preferred embodiment, the data store 526, which is coupled to the insert/retrieve logic 502 as shown by bi-directional arrow 528, comprises a plurality of first-in-first-out data structures (FIFOs) 530*a–c*. Each FIFO 530*a–c*, moreover, is associated with a transmission start time range. For example, FIFO 530*a* may be associated with a near transmission start time range, FIFO 530*b* with a mid transmission start time range and FIFO 530*c* with a far transmission start time range relative to the current time as determined by system time generator 514, which may also be coupled to the insert/retrieve logic 502 as shown by arrow 532. As message pointer and start time information is received by the insert/retrieve logic 502, via arrows 338 and 312, it is initially buffered in one of the FIFOs 530*a–c*.

The particular FIFO 530*a–c* selected by the insert/retrieve logic 502 for storing a given message and transmission start time is based on the value of the given start time. More specifically, when a message pointer and start time pair are received at calendar queue 500, logic 502 first compares the message start time to the current time from generator 514. If the message start time is close to the current time, then the message pointer and start time are stored in the near range FIFO 530*a*. If the start time is far away from the current time, then the message pointer and start time are stored in the far range FIFO 530*c*. If the start time falls somewhere in between, then the message pointer and start time are stored in the mid range FIFO 530*b*. Thus, each particular FIFO 530*a–c* contains message pointers and start times that fall within the same rough time range. However, since the message pointers and start times are stored in the respective FIFOs 530*a–c* as they are received by calendar queue 500, they are not time ordered within the individual FIFOs 530*a–c*.

In this embodiment, the insert/retrieve logic 502 periodically takes the message pointers and transmission start times from the near range FIFO 530*a* and copies them into the TCAM 506 and RAM 512 in a similar manner as described above in connection with calendar queue 318. That is, logic 502 switches multiplexer 504 to search TCAM 506 for entries matching the free pattern 508. As free entries are located, the start times from the near FIFO 530*a* are copied therein while the message pointers are copied into corresponding entries in the RAM 512. By moving the contents of the near range FIFO 530*a* into TCAM 506 and RAM 512, the start times are placed in time order. After moving the contents of the near range FIFO 530*a* into the TCAM 506 and RAM 512, logic 502 now treats FIFO 530*b* as the "new" near range FIFO, FIFO 530*c* as the "new" mid range FIFO, and FIFO 530*a* as the "new" far range FIFO for purposes of storing new message pointers and start times that it receives.

The contents of TCAM 506 are searched, and start times located and retrieved, in a similar manner as described above in connection with calendar queue 318.

It should be understood that calendar queue 500 may use more than three FIFO queues 530, and that other memory structures besides FIFOs may be advantageously utilized. Referring to FIG. 3, it should be further understood that the temporary data store 526 of FIG. 5 may be located in front of the calendar queue 318, and loaded with start times and message pointers by the ALU 304 and the selection circuit 314, rather than insert/retrieve logic 502.

Figure 6:
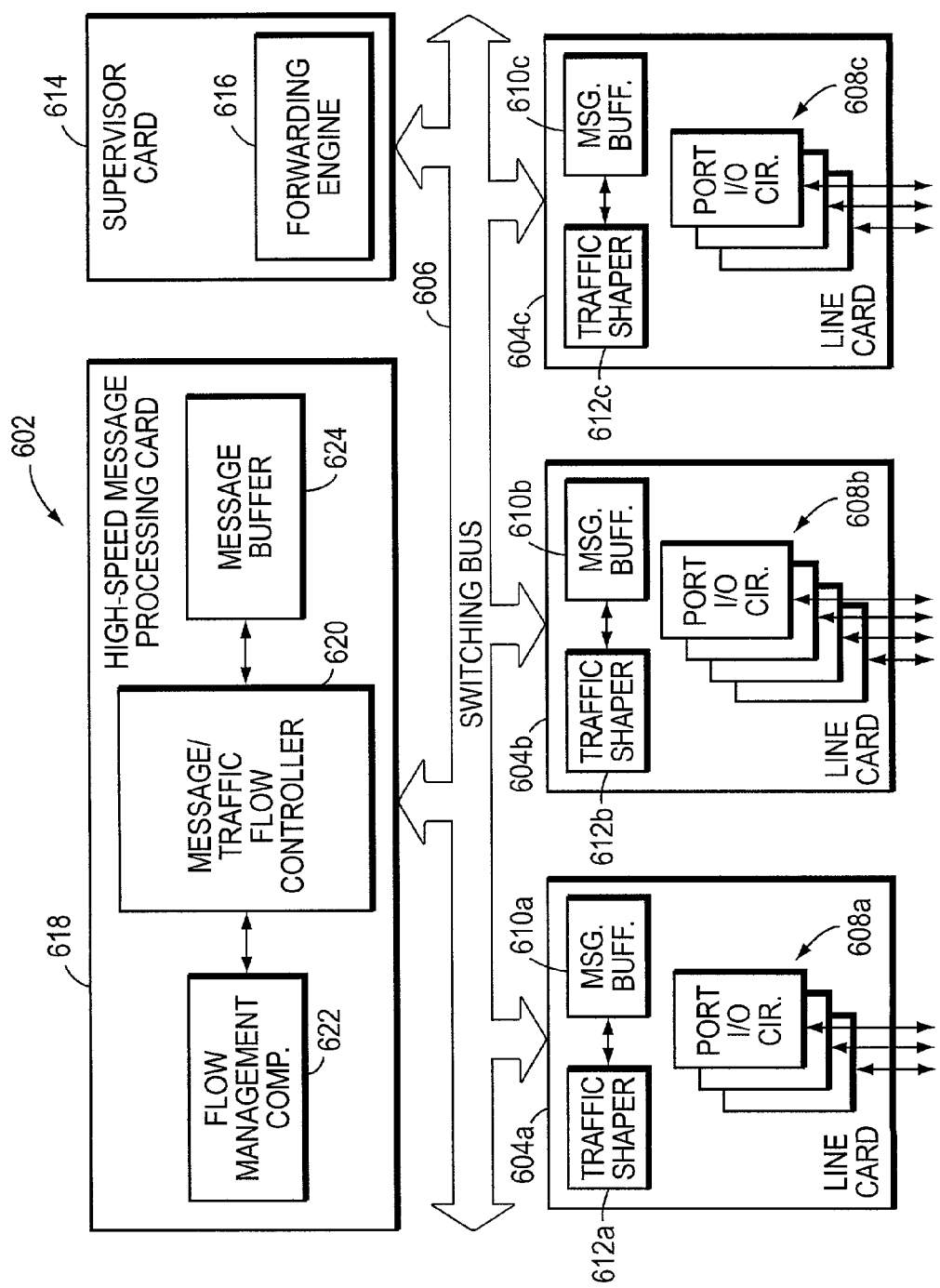
FIG. 6 is a partial functional block diagram of another intermediate network device having an alternative embodiment of the traffic shaper.

FIG. 6 is a highly schematic, partial functional diagram of an intermediate network device 602 in which the traffic shaper functionality is distributed across the line cards. Device 602 includes a plurality of line cards 604*a*–604*c* that are coupled to a high-performance switching bus 606. Each line card 604a–604c, moreover, has a plurality of corresponding port input/output (I/O) circuits 608a–608c, respectively, that are each coupled to respective ports (not shown), thereby connecting device 602 to the entities of the corresponding network (not shown). Each line card 604a–c further includes its own message buffer 610a–c and its own traffic shaper module 612a–c. As described above, the port I/O circuits 608 cooperate with their respective line cards 604 to efficiently transmit data (e.g., network messages) to, and receive data from, the switching bus 606. Also coupled to switching bus 604 are one or more supervisor cards, such as supervisor card 614, which may include a forwarding engine 616, and a high-speed message processing card 618. Message processing card 618 includes a message/traffic flow controller 620, a flow management component 622 and a message buffer 624. Preferably, the supervisor and message processing cards 614, 618 are merged onto a single card or board so that messages need only cross bus 606 once.

Each traffic shaper module 612a–c located on the line cards 604a–c is preferably configured and arranged like traffic shaper 218 described above and generally operates in a similar manner.

Operation of this embodiment preferably proceeds as follows. Message packets from a web server, such as web server 102 (FIG. 1), that are received by device 602 are captured by a respective port I/O circuit, e.g., I/O circuit 608a. The respective line card, e.g., line card 604a, copies the packets into its message buffer 610a and also drives them onto the high-speed bus 606. From here, the packets are received by the other line cards 604b and 604c, and copied into their message buffers 610b and 610c, respectively. The packets are also received at the message processing card 618 and stored at its message buffer 624. At the supervisor card, the 614, the forwarding engine 616 examines one or more fields of the packet (e.g., source and destination IP addresses, source and destination TCP/UDP port numbers, transport protocol, etc.) and not only determines whether the packets should be shaped, but also identifies the line card 604 and the port I/O circuit 608 pair from which the packets should be forwarded.

The forwarding engine 616 notifies the respective line card/port I/O circuit pair that is to forward the packet, e.g., line 604c, and, assuming the packet should be shaped, the forwarding engine 616 also determines the corresponding SID and provides it along with other packet-related information to line card 604c. The other line cards, e.g., cards 604a and 604b, simply discard the packet from their message buffers 610a and 610b. At line card 604c, the traffic shaper 612c computes a transmission start time(s) for the packet based on the received SID and loads this information in its forwarding trigger (not shown) along with the message pointer information (i.e., the location of this packet in buffer 610c). When the calculated transmission start time is reached, the traffic shaper 610c notifies the line card 604c which retrieves the packet from the message buffer 610c and forwards it from the port I/O circuit previously identified by the forwarding engine 616. In this embodiment, packets traverse bus 606 only once, significantly increasing the packet handling speed of the device 602.

In yet another embodiment, forwarding engine 616, in addition to traffic shaper 612, may be distributed across one or more line cards 604 (e.g., de-centralized forwarding). That is, at least some of the line cards also have their own forwarding engines for making forwarding decisions.

Figure 7:
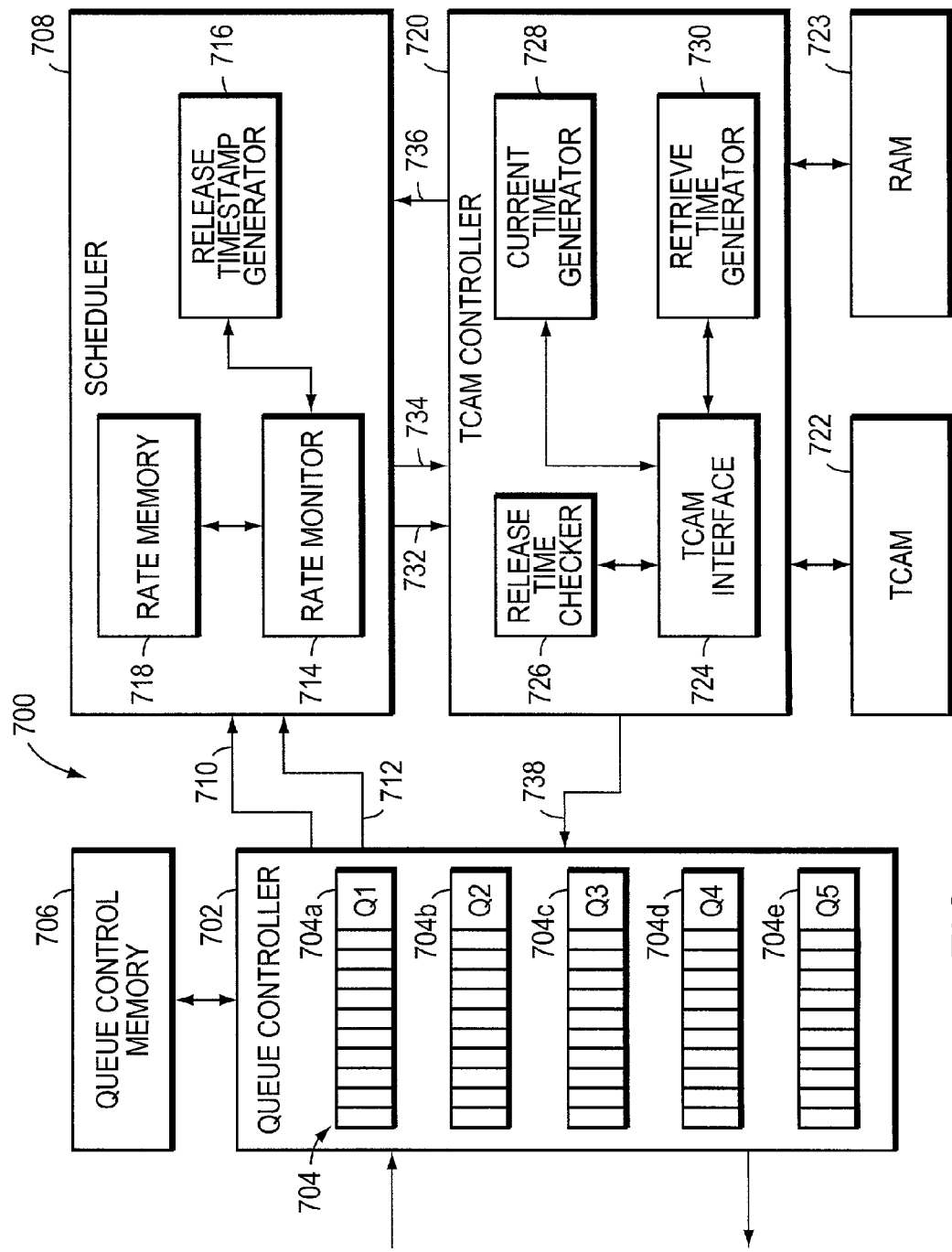
FIG. 7 is a functional block diagram of the traffic shaper of the present invention.

FIG. 7 is a highly schematic, block diagram of the traffic shaper 700 in accordance with the present invention. Traffic shaper 700 includes a queue controller 702 that includes a plurality of first in first out (FIFO) queues 704, such as queues 704a–e. FIFO queues 704 are preferably organized as one or more link lists, although other data structures may be advantageously used. The queue controller 702 is configured to store and retrieve information from queues 704. The queue controller 702 also includes or has access to a queue control memory 706 in which information regarding queues 704a–e may be stored. Traffic shaper 700 further includes a scheduler 708 to which the queue controller 702 is coupled. In particular, the queue controller 702 and scheduler 708 are connected by a first bypass signal line, which is represented by arrow 710, that can be operated by the queue controller 702. Queue controller 702 and scheduler 708 are also connected by at least one data path, which is represented by arrow 712. As described below, data path 712 can be used by the queue controller 702 to pass various information to the scheduler 708, such as a shaper identifier (SID) value, a next SID value, a packet length, and a Qtime.

The scheduler 708 includes a plurality of sub-components, such as a rate monitor 714, a release time stamp generator 716 and a rate memory 718. Traffic shaper 700 also includes at least one TCAM controller 720 that is operably coupled to one or more TCAMs, such as TCAM 722, and associated RAMs, such as RAM 723. The TCAM controller 720 includes a TCAM interface 724 that is configured to store information in TCAM 722 and RAM 723 as well as to search TCAM 722 for matching entries. TCAM controller 720 further includes a release time checker 726, a current time generator 728 and a retrieve time generator 730. The current time generator 728 is preferably implemented through a counter that increments at a constant rate. The retrieve time generator 730 is also preferably implemented through a counter. The retrieve time counter, however, increments at a faster rate than the current time counter, and can be selectively paused or suspended.

Scheduler 708 is coupled to TCAM controller 720 by a first data path, which is represented by arrow 732, so that the scheduler 708 may pass various information, such as a SID value and a release timestamp to the TCAM controller 720. Scheduler 708 and TCAM controller are also connected by a second bypass signal line, which is represented by arrow 734 and can be operated by the scheduler 708. Another data line, which is represented by arrow 736, is used to pass current time information as computed by the current time generator 728 to the scheduler 708. The TCAM controller 720 is coupled to the queue controller 702 by a data path, which is represented by arrow 738, so that various information, such as a Qtime and a SID value, can be passed from the TCAM controller 720 to the queue controller 702 in order to release a particular packet.

The TCAM interface 724 preferably includes or has access to a plurality of registers. Specifically, the TCAM interface 724 has a retrieve time register 740, a next retrieve time register 742, a retrieve mask register 744, a current bit position register 746 and a previous bit position register 748. As described below, registers 740–748 are used by the TCAM interface 724 to store corresponding values that, in turn, are employed to determine a retrieve time for use in searching TCAM 722.

Figure 8:
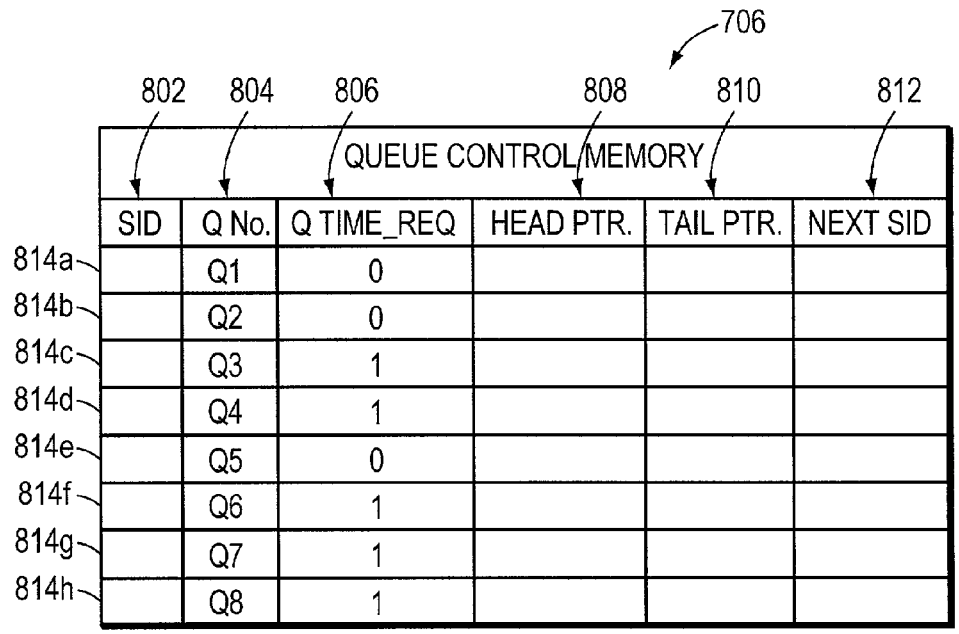
FIGS. 8 and 9 are highly schematic diagrams of data structures of the traffic shaper of FIG. 7.

FIG. 8 is a highly schematic, block diagram of queue control memory 706. As shown, queue control memory 706 is preferably arranged as a table or array having a plurality of columns and rows whose intersections define corresponding table records or cells. In particular, the queue control memory 706 includes a shaper identifier (SID) column 802, a queue number (Q No.) column 804, a Qtime_Request column 806, a queue head pointer (ptr) column 808, a queue tale pointer column 810 and a next SID column 812. Queue control memory 706 also includes a plurality of rows 814a–h each of which contains corresponding information (e.g., queue number, Qtime_request, head pointer, etc.) for a respective SID as specified in column 802.

Figure 9:
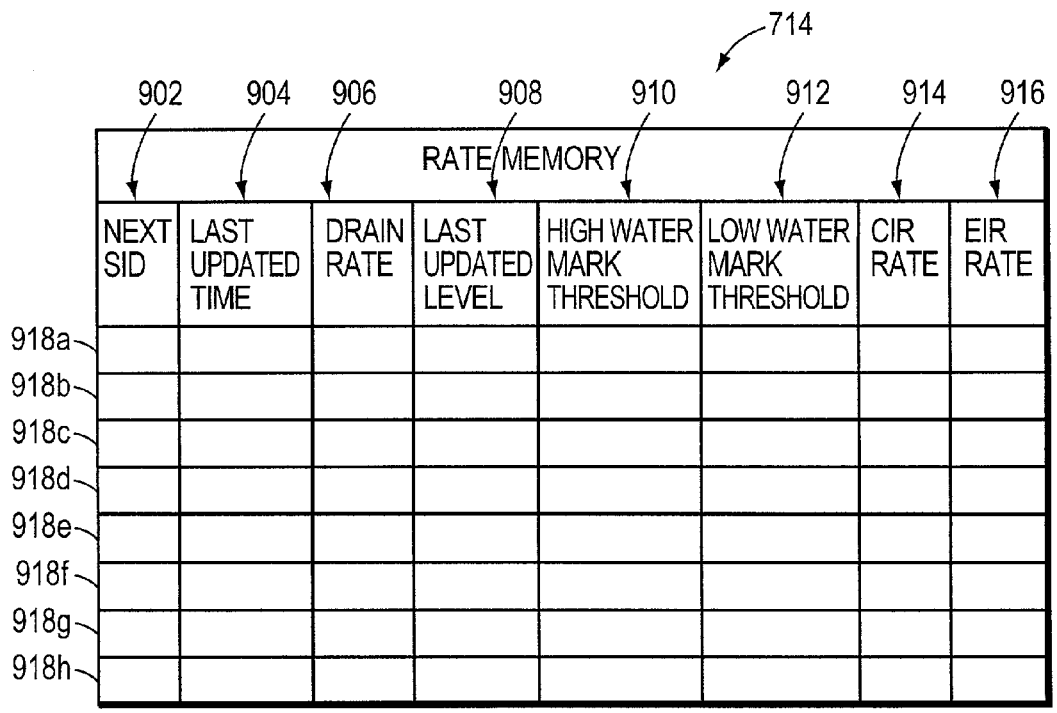

FIG. 9 is a highly schematic, block diagram of rate memory 714, which is similarly arranged as a table or array having a plurality of columns and rows defining corresponding records or cells. Specifically, rate memory 714 includes a SID column 902, a last updated time column 904, a drain rate column 906, a last updated level column 908, a high water mark threshold 910, a low water mark threshold 912, a Committed Information Rate (CIR) column 914 and an Excess Information Rate (EIR) column 916. Rate memory 714 also includes a plurality of rows 918a–h each of which contains corresponding information (e.g., last updated time, drain rate, last updated level, etc.) for a respective SID value as specified in column 902.

As described below, with traffic shaper 700, release times are preferably computed and stored within TCAM 722 as packets are released by the shaper 700. That is, when the TCAM controller 720 directs the queue controller 702 to release the packet at the head of a particular queue 704, the queue controller 702 not only releases the designated packet; it also requests that a new release time be computed for this queue 704 and that the computed release time be stored at the TCAM 722. Alternatively, the queue controller 702 and scheduler 708 may assert bypass signals 710 and 734 to direct the scheduler 708 not to compute a new release time and to direct the TCAM controller 720 to immediately provide a release command rather than store a release time.

FIGS. 10A–D and 11A–C are flow diagrams of the method of the present invention.

Enqueuing Packets into the Traffic Shaper

Figure 10A:
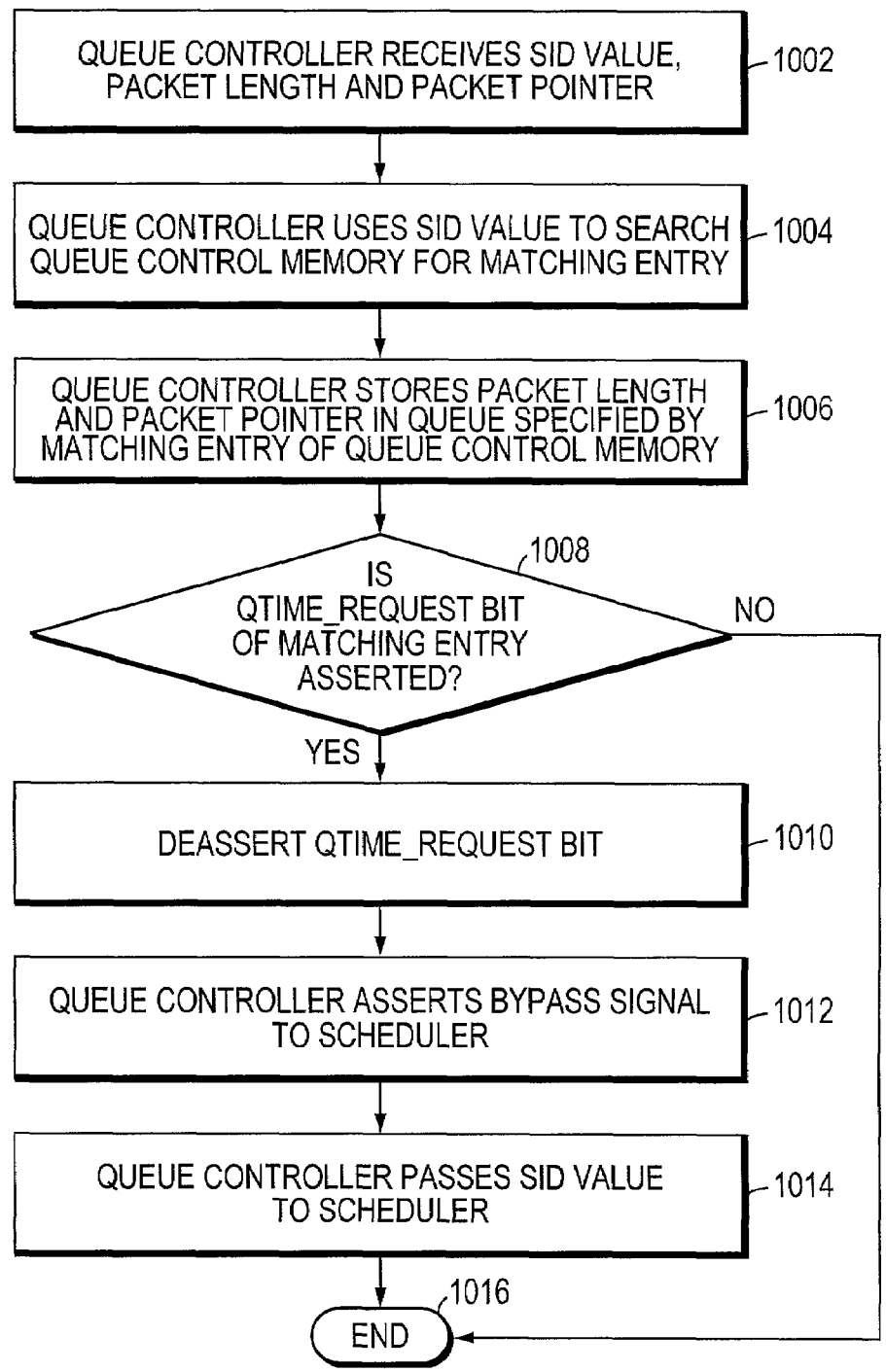
FIGS. 10 and 11 are flow diagrams of the present invention.

First, packets to be shaped are stored in at least one queue 704 of the queue controller 702 (FIG. 7). Specifically, for each packet that is to be shaped, the queue controller 702 receives a SID value, a packet length and a packet pointer from the message/traffic flow controller 214 (FIG. 2), as indicated at block 1002 (FIG. 10A). The queue controller 702 uses the received SID value to index and/or search the queue control memory 706 to identify the particular queue 704 into which the received packet information is to be stored, as indicated at block 1004. In a preferred embodiment, a separate queue 704 is established or created for each SID value. That is, each SID value is associated with a different queue 704 and this association is preconfigured into the queue control memory 706. For example, queue controller 702 may have 64K queues 704 and thereby support up to 64K different SID values. When the queue controller 702 searches the queue control memory 706 with a particular SID value, only one queue number is preferably identified. Suppose, for example, that the received SID value matches the SID for row 814d of the queue control memory 706. In response, the queue controller 702 stores the received packet length and packet pointer in the matching queue number, i.e., Q4, which is queue 704d, as indicated at block 1006.

Preferably, the queue controller 702 uses the matching tail pointer value from column 810 of entry 814d to locate the tail of queue 704d. The packet length and packet pointer are then stored at this location in the respective queue 704d. After storing the packet length and packet pointer, the queue controller 702 preferably updates, e.g., increments, the tail pointer for entry 814d of the queue memory 706 so as to identify the next open cell of queue 704d.

Next, the queue controller 702 checks the Qtime_request bit from column 806 for entry 814d, as indicated at decision block 1008. Depending on the status of the Qtime_request bit, the queue controller 702 either asserts the bypass signal 710 or considers the packet enqueuing process to be complete. More specifically, if the Qtime_request bit is asserted, then the respective queue, i.e., queue 704d, is empty and this is the first packet length and packet pointer pair being added to the queue 704d. If the Qtime_request bit is not asserted, then queue 704d already contains at least one packet length and packet pointer pair waiting to be released by the traffic shaper 700. If the Qtime_request bit is asserted, the queue controller 702 responds first by deasserting the Qtime_request bit, as indicated at block 1010, thereby indicating that a packet length and packet pointer pair has now been added to queue 704d. It then asserts or sets the bypass signal 710 to the scheduler 708 since there is no release time already loaded into the TCAM 722 for this queue 704d, as indicated at block 1012. The queue controller 702 also provides the scheduler 708 with the SID value that it received from the message/traffic flow controller 214 for the packet length and packet pointer pair, as also indicated at block 1014. The enqueuing process is then complete, as indicated by end block 1016.

If the Qtime_request bit is not asserted, then there is at least one other packet in the queue 704d. In this case, a release time has already been computed for the queue 704d and is pending in the TCAM 722. Therefore, the queue controller 702 preferably takes no further action, as also indicated by end block 1016.

At this point, the process of enqueuing packets into the queue controller 704 is complete.

Dequeuing Packets from the Traffic Shaper

Packets are preferably dequeued from particular queues 704 of the queue controller 702 in response to one of three conditions. First, a packet is dequeued in response to bypass signals 710 and 734 being set. Second, a packet is dequeued when the release time computed by the scheduler 708 for a given queue 704 turns out to be less than the current time. Third, a packet is dequeued when the computed release time for a given queue 704 matches the time produced by the retrieve time generator 730. Suppose, for example, that the queue controller 702 upon enqueuing a given packet determines that it is the first packet to be added to the queue. As described at steps 1012 and 1014 above, the queue controller 702 responds by asserting bypass signal 710 and passing the SID value to the scheduler 708.

Figure 10B:
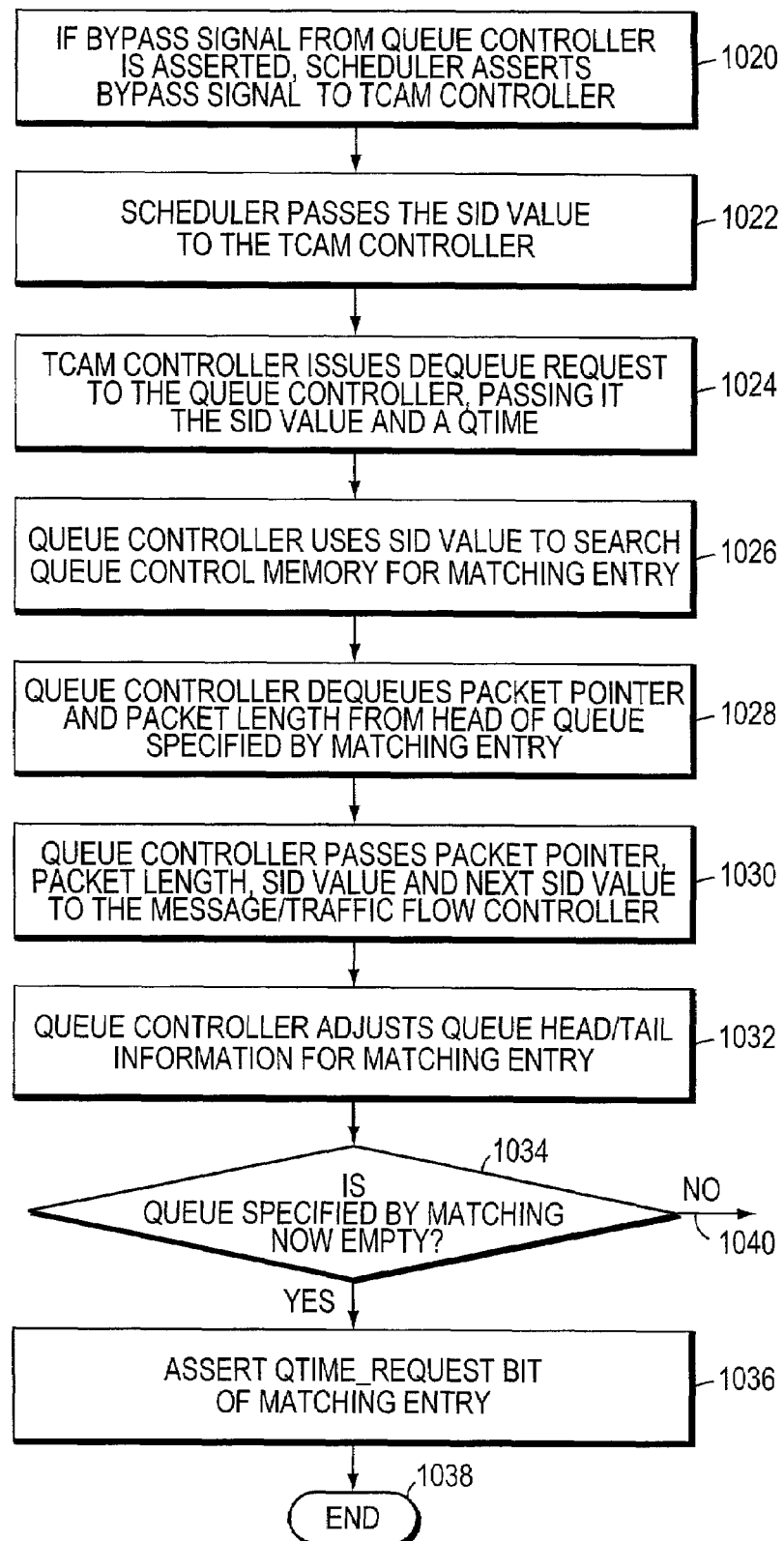

When bypass signal 710 is asserted, the scheduler 708 responds by asserting bypass signal 734 to the TCAM controller 720, as indicated at block 1020 (FIG. 10B). It also passes the SID value that it received from the queue controller 702 via data path 712 to the TCAM controller 720 via data path 732, as indicated at block 1022. In other words, the scheduler 708 does not compute a release time in this instance. When bypass signal 734 is asserted, the TCAM controller 720 responds by providing a release command to the queue controller for the subject SID value. Specifically, the TCAM controller 720 uses data path 738 to pass the SID value that it received from the scheduler 708 at the time bypass signal 734 was asserted back to the queue controller 702, as indicated at block 1024. In addition to the SID value, the TCAM controller 720 also passes a Qtime to the queue controller 702 via data path 738, as also indicated by block 1024. This Qtime preferably equals the current time, as specified by the TCAM controller's current time generator 728, at which the release command or dequeue request is sent to the queue controller 702.

The SID value and the Qtime are received by the queue controller 702. In response, the queue controller 702 uses the SID value from the TCAM controller 720 to index and/or search the queue control memory 706 to identify the particular queue from which the next packet is to be removed, as indicated at block 1026. Here, that the SID value matches entry 814d (FIG. 8) of the queue control memory 706, thereby identifying queue 704d or Q4. Queue controller 702 then removes, i.e., dequeues, the packet length and packet pointer from queue 704d. Specifically, the queue controller 702 uses the head pointer from column 808 of matching entry 814d to locate the head of queue 704d, and retrieves the packet length and packet pointer from the head of queue 704d, as indicated at block 1028. The queue controller 702 then passes the packet pointer and the SID value to the message/traffic flow controller 214 (FIG. 2), as indicated at block 1030.

The queue controller 702 then either adjusts the head pointer value from column 808 (FIG. 8) for entry 814d so as to specify the new packet length and packet pointer pair that are now at the head of queue 704d or advances all of the entries for queue 704d and updates the tail pointer value from column 810 so as to specify the new tail of queue 704d, as indicated at block 1032. Having dequeued a packet length and packet pointer from queue 704d, the queue controller 702 next determines whether queue 704d is empty, as indicated at decision block 1034. For example, the queue controller 702 may determine whether the head pointer and tail pointer for queue 704d now specify the same location. If queue 704d is now empty, the queue controller 702 asserts the Qtime_request bit from column 806 for entry 814d, as indicated at block 1036, and the dequeuing process is considered complete, as indicated by end block 1038.

Figure 10C:
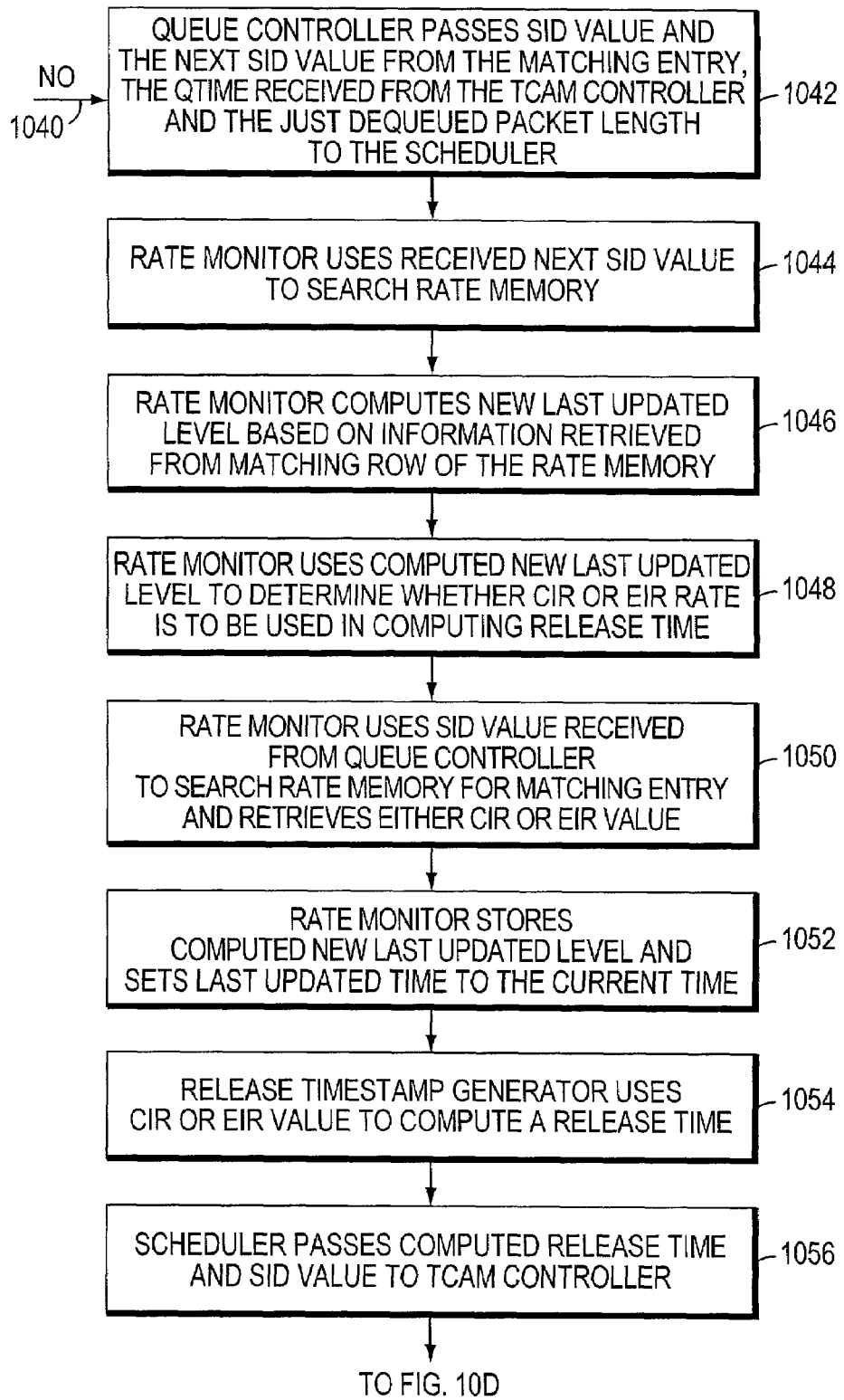

If queue 704d is not empty, i.e., there is at least one other packet pointer and packet length pair still in the queue, the queue controller 702 passes the SID value and the next SID value from entry 814d of the queue control memory 706, the Qtime received from the TCAM controller 720 and the packet length value that was just dequeued from queue 704d to the scheduler 708, as indicated by No arrow 1040 leading to block 1042 (FIG. 10C). This information is preferably passed via data path 712 and is used by the scheduler 708 to compute a new release time for queue 704d. Preferably, the scheduler 708 first decides whether to use a CIR or EIR value to compute the release time. In particular, the rate monitor 714 uses the next SID value that it received from the queue controller 702 to index or search column 902 of its rate memory 714 (FIG. 9) and identify a matching row, e.g., row 918f, as indicated at block 1044. Upon identifying the matching row, the scheduler 708 first determines a new last updated level, as indicated by block 1046, by using the following algorithm:

new last updated level=old last updated level+packet length−drained amount where, the old last updated level is taken from column 908 of the matching entry 918f of rate memory 714, packet length is received from queue controller 702 and drained amount is determined as follows:

drained amount=drain rate*elapsed time where, drain rate is taken from column 906 of the matching entry of rate memory 714 and elapsed time=current time−last updated time where, current time is the current time value received from the TCAM controller 720 via data path 736 and last updated time is taken from column 904 of the matching entry 918f of rate memory 714.

Using the computed new last updated level, the rate monitor 714 then determines whether a CIR or EIR value is to be used, as indicated at block 1048. For example, if the computed new last updated level is greater than the high water mark threshold value from column 910, a CIR value is to be used in computing the release timestamp; otherwise, an EIR value is to be used. In particular, the rate monitor 714 uses the SID value received from the queue controller 702 to perform another lookup of column 902 of rate memory 714 (as opposed to the next SID value which was used in the prior lookup) in order to identify a second matching row, e.g., row 918h, as indicated at block 1050. If the rate monitor 714 determined that a CIR value is to be used, it retrieves the CIR value from column 914 of matching row 918h; otherwise it retrieves the EIR value from column 916 of matching row 918h, as also indicated by block 1050. In either case, the rate monitor 714 also stores the computed new last updated level in place of the old value of column 908 for the first matching entry 918f and sets the last updated time for the second matching entry 918h to the current time, as indicated at block 1052. In other words, each time the rate monitor 714 accesses the rate memory 718, it resets the last updated level and the last updated time for the respective entries.

Rather than comparing the new last updated level to the high water mark threshold, the rate monitor 714 may alternatively determine whether the new last updated level is less than the low water mark threshold value from column 912 of the matching entry. If so, the rate monitor 714 uses the EIR value, otherwise it uses the CIR value.

Furthermore, if the next SID value is zero, rather than searching its rate memory 718 as indicated by block 1044 and performing steps 1046 and 1048, the rate monitor 714 simply uses the received SID value to search its rate memory 718 for a matching entry and uses the CIR value from this matching entry in the computation of the respective release time. In other words, when the next SID value is zero, the CIR value is used.

Using the selected CIR or EIR value, the release timestamp generator 716 then generates a release time for this queue, i.e., queue 704d, as indicated at block 1054. Preferably, the release timestamp generator 716 uses the following formula or algorithm in order to calculate a release time:

release time=Qtime+(packet length)/(selected CIR or EIR value)

Figure 10D:
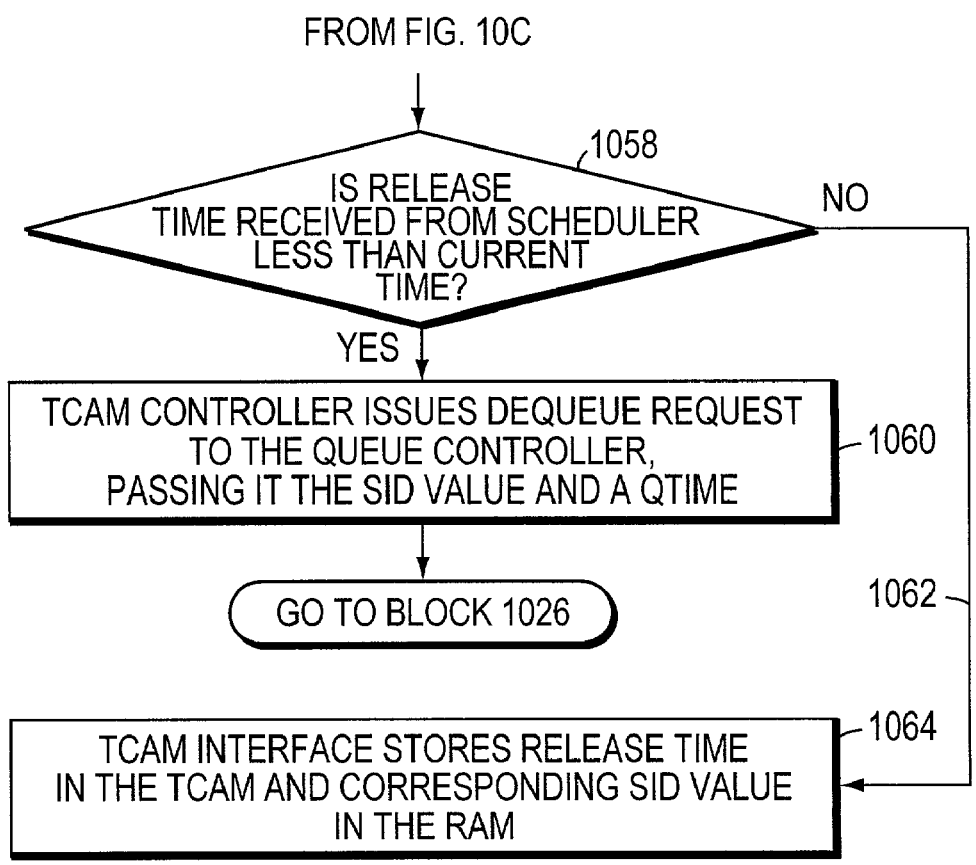

The scheduler 708 then passes this computed release time as well as the SID value to the TCAM controller 720 via data path 732, as indicated at block 1056. The TCAM controller 720 first determines whether the received release time is less than the current time as specified by its current time generator 728, as indicated by decision block 1058 (FIG. 10D). If the release time is less than the current time, the TCAM controller 720 does not store anything in TCAM 722. Instead, it provides a dequeue command to the Queue controller 702 by passing it the SID value and a Qtime (which is the current time as determined by the current time generator 728), as indicated at block 1060. The queue controller 702 responds by releasing the packet stored at the head of the queue identified by the received SID value and, assuming the queue is not rendered empty, passes the SID, next SID, packet length and Qtime to the scheduler, as described above in connection with steps 1026–1042. If the received release time is not less than the current time, the TCAM controller 720 passes the release time and the SID value to the TCAM interface 724, which, in turn, loads the release time in a free entry of the TCAM 722 and loads the SID value in the corresponding entry of the RAM 723, as indicated by No arrow 1062 leading to block 1064.

As described above at step 1030 (FIG. 10B), in response to a release request, the queue controller 702 passes the packet pointer, packet length, SID value and next SID value to the message/traffic flow controller 214 (FIG. 2). The message/traffic flow controller 214 examines the next SID value to determine whether the corresponding network message should be subject to another level of shaping. More specifically, the message/traffic flow controller 214 determines whether or not the next SID value is zero. If the next SID value is non-zero, then at least one more level of shaping is to be applied to the respective network message. Consequently, the message/traffic flow controller 214 returns the packet length and packet pointer to the queue controller 702. This time, however, the "SID" value that the message/traffic flow controller 214 sends to the queue controller 702 along with the packet length and packet pointer is the non-zero next SID value that was received by the message/traffic flow controller 214 from the queue controller 702.

The queue controller 702 responds as though this were a new network message to be shaped. That is, the queue controller 702 uses the "SID" value (i.e., the previous next SID) to search its queue control memory 706 and identify the particular queue 704 into which the packet length and packet pointer are to be stored. Since the next SID value will typically differ from the original SID value, the packet length and packet pointer will be stored in a different queue 704 as compared to the last time this information was received and stored by the queue controller 702. That is, steps 1002–1016 (FIG. 10A) are performed.

Searching the TCAM for Expired Release Times

In addition to loading release times into TCAM 722 and the corresponding SID values into RAM 723, the TCAM controller 720 also searches the TCAM 722 for "expired" release times. In particular, the TCAM controller 720 continuously searches TCAM 722 for release times that match a retrieve time computed by the retrieve time generator 730. In the preferred embodiment, the retrieve time generator 730 produces a mask in addition to retrieve times. The mask basically specifies which bit position or positions, if any, of the retrieve time being applied to the TCAM 722 can be treated as "don't care" values. As described below, the use of the mask allows a range of release times to be matched during each search of the TCAM 722. The retrieve time generator 730 is thus able to search the TCAM 722 and catch up to the current time as specified by the current time generator 728 faster.

Figure 11A:
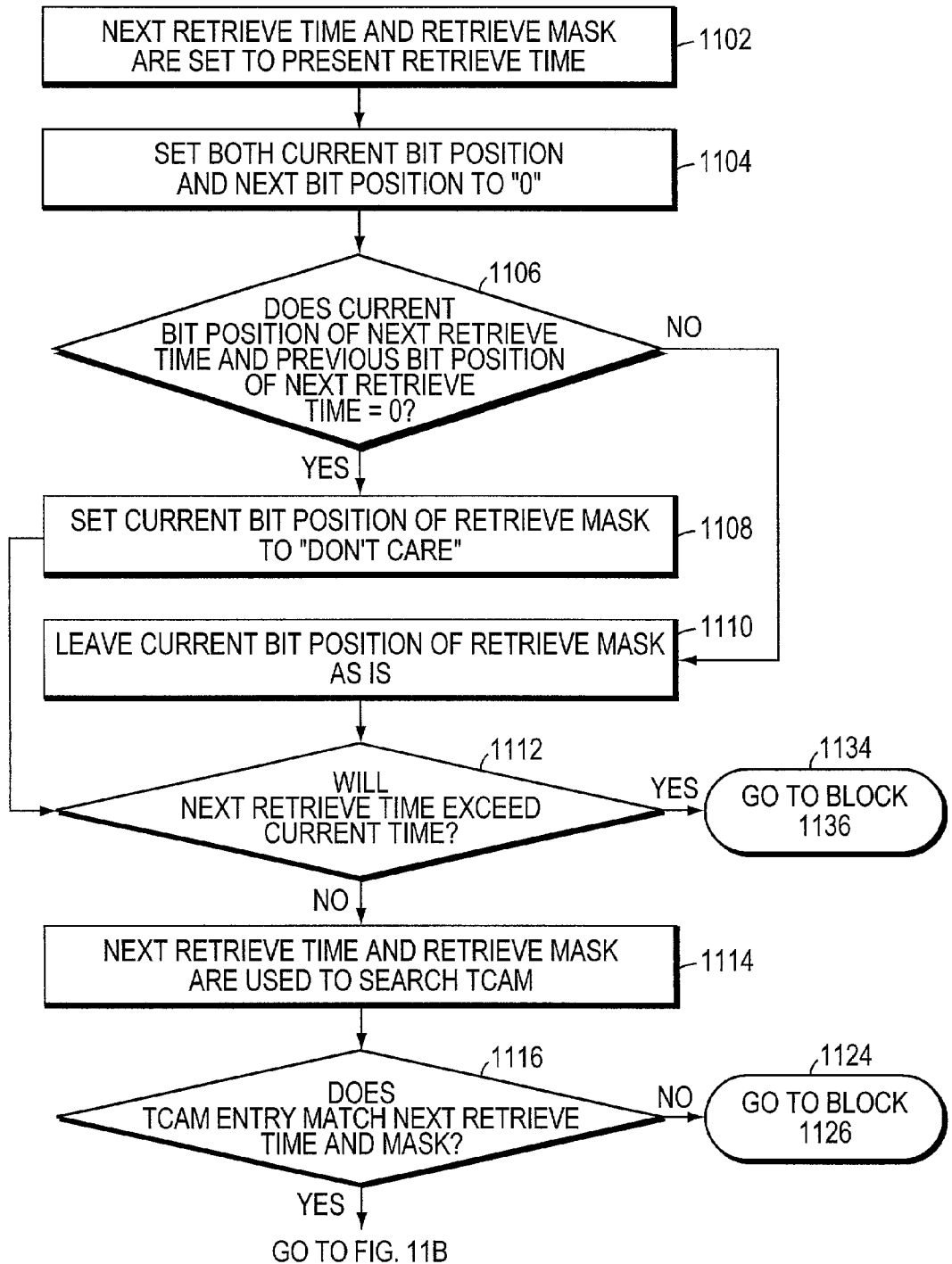
Figure 11B:
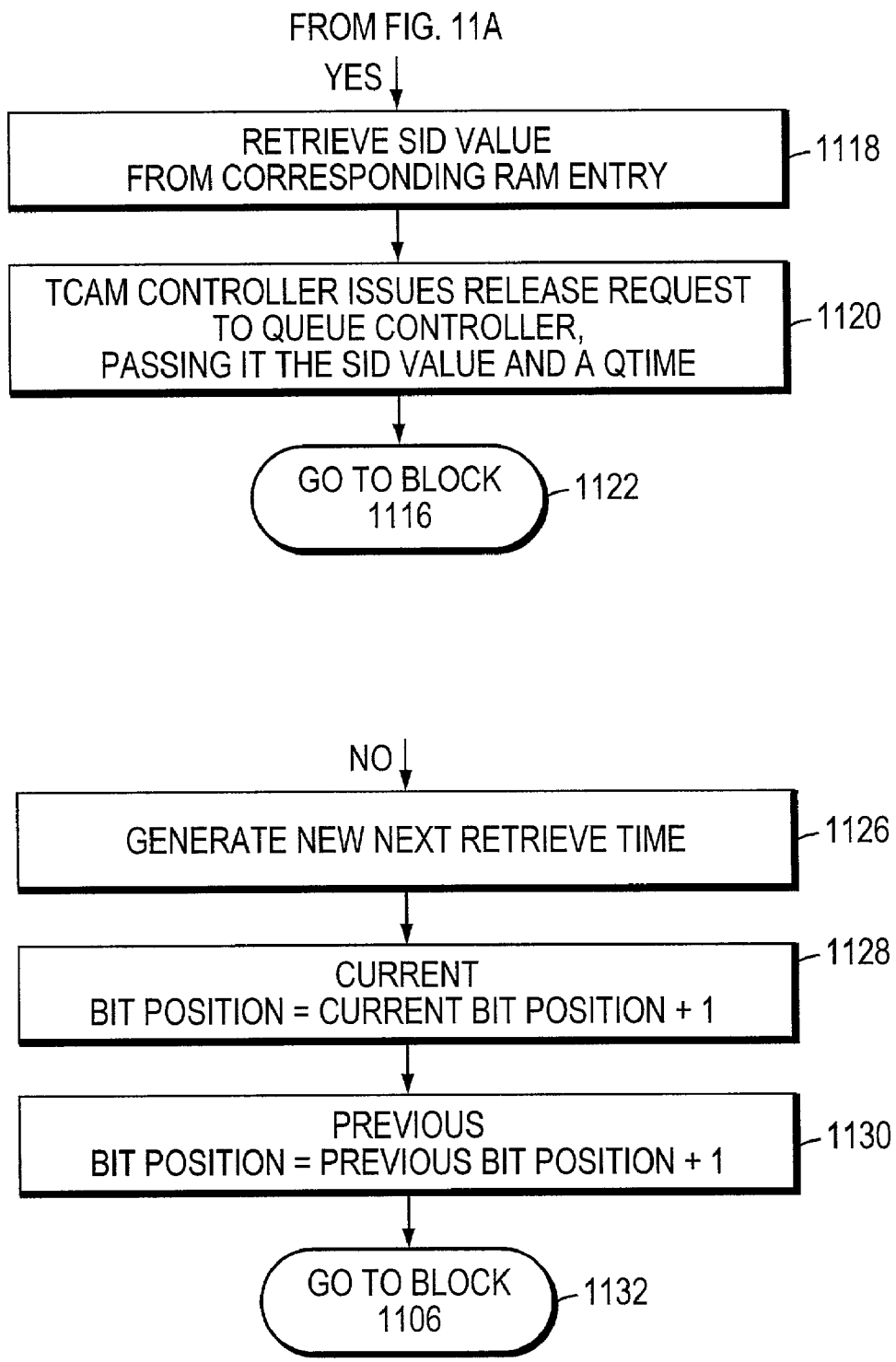
Figure 11C:
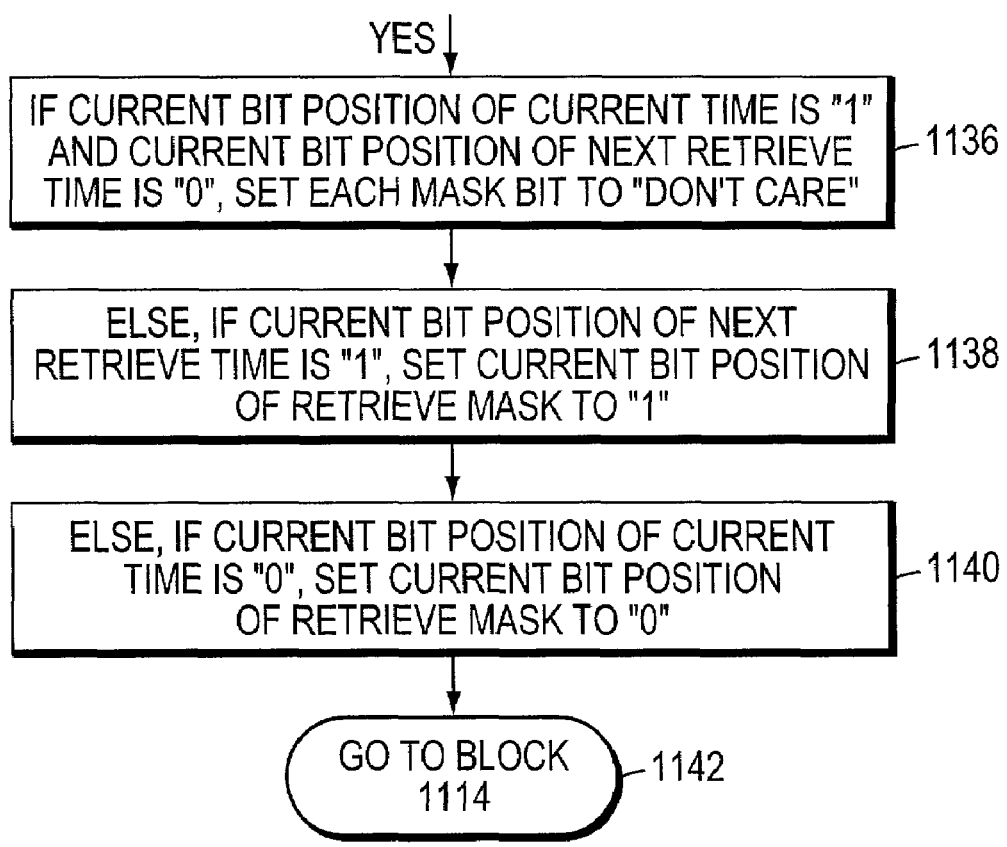

FIGS. 11A–C is a flow diagram of the steps for searching the TCAM 722. First, several values are initialized by the TCAM controller 720. In particular, a next retrieve time and a retrieve mask are both set to equal the retrieve time presently specified by retrieve time generator 730, as indicated at block 1102. To set the mask to its operable values, the TCAM controller 720 examines each bit of the next retrieve time going from the least significant bit (LSB) to the most significant bit (MSB). In the preferred embodiment, the retrieve mask is 72 bits long which is the width of TCAM 722, whereas the release times computed by the release timestamp generator 712 and the retrieve times specified by the retrieve time generator 730 are both 68 bits long. As part of the initialization, the TCAM controller 720 also sets both the current bit position and the previous bit position to "0", as indicated at block 1104. The TCAM controller 720 then generates a new next retrieve time and a new retrieve mask. In particular, it determines whether the result of ANDing the bit value of the next retrieve time corresponding to the current bit position (e.g., "0") with the bit value of the next retrieve time corresponding to the previous bit position (e.g., "0") is "0", as indicated at decision block 1106. If so, the bit value of the retrieve mask corresponding to the current bit position is set to "don't care", e.g., "x", as indicated at block 1108. If the result of the AND operation is not "0", the bit value of the retrieve mask corresponding to the current bit position is left as is, as indicated at block 1110.

The TCAM controller 720 then determines whether the next retrieve time and the mask will result in retrieve time(s) that exceed the current time specified by current time generator 728, as indicated at decision block 1112. More specifically, within the next retrieve time, the TCAM controller 720 substitutes a "1" in each bit corresponding position of the retrieve mask that is set to don't care, and determines whether the resulting value exceeds the current time. If not, the TCAM interface 724 then searches the TCAM 722 using this next retrieve time, as modified by the retrieve mask, as indicated at block 1114. The TCAM interface 724 determines whether an entry of the TCAM 722 matches the next retrieve time (as masked), as indicated at decision block 1116. If so, the SID value stored in the RAM entry that corresponds to the matching TCAM entry is retrieved, as indicated at block 1118 (FIG. 11B). The TCAM controller 720 then issues a release request to the queue controller 702 by passing it the retrieved SID value and a Qtime, where the Qtime equals the calculated release time from the matching TCAM entry, as indicated at block 1120. This process is continued until there are no more matching entries in the TCAM 722, as indicated by block 1122 which returns processing to block 1116 (FIG. 11A).

At this point, the retrieve time generator 730 is called upon to produce a new next retrieve time, as indicated at block 1124 (FIG. 11A) which advances processing to block 1126 (FIG. 11B). The next retrieve time is preferably arrived at by substituting, within the retrieve time, each masked value with "1" and then incrementing this value by "1". In addition, the current and previous bit positions are both incremented, as indicated at blocks 1128 and 1130. As indicated by block 1132, processing then returns to block 1116 (FIG. 11A) where the current and previous bit positions of the new present retrieve time are evaluated to determine whether the current bit position of the mask is to be set to "don't care" or is to be left as is.

If a new present retrieve time exceeds the current time as indicated by decision block 1112 (FIG. 1A), then, starting from the current bit position, the TCAM controller 720 sets each mask bit to "don't care" if the current bit position of the current time value is "1" and the current bit position of the next retrieve time is "0", as indicated by block 1134 (FIG. 11A) which advances processing to block 1136 (FIG. 11C). If the current bit position of the next retrieve time is "1", then the current bit position of the retrieve mask is set to "1", as indicated at block 1138. Finally, if the current bit position of the current time is "0", then the current bit position of the retrieve mask is set to "0", as indicated by block 1140. As indicated by block 1142, once the next retrieve time and retrieve mask are set so as to not exceed the current time, processing returns to block 1114 (FIG. 11A), where the new present retrieve time is matched against the entries of the TCAM 722.

As shown, by noting the Qtime and using it in the computation of future release times, drifting errors that might otherwise occur can be avoided. More specifically, in an ideal arrangement, release requests would be issued at the precise instant that the current time equals the computed release time. However, it takes some time to identify expired release times stored in the TCAM 722 and to issue release requests. In addition, several release times may expire at once, requiring multiple release requests. Accordingly, release requests are likely to lag behind computed release times. Such lags could accumulate resulting in a significant drifting error if messages are assumed to have been released at their computed release times. To avoid such drifting errors, the scheduler 708 preferably uses the Qtime, which, in most cases, is the computed release time as opposed to the actual current time a network message is released by the traffic shaper, to compute the next release time for the respective queue. As a result, any lag between the computed release time and the corresponding release request is not allowed to accumulate during the next release time computation.

Furthermore, the use of a retrieve mask allows multiple entries of TCAM 722 to be searched substantially simultaneously, thereby improving the processing speed of the traffic shaper. The retrieve mask also allows the retrieve time to catch up to the current time more quickly as every individual retrieve time need not be searched against the TCAM 722. Nonetheless, it should be understood that the traffic shaper of FIG. 7 could be implemented without a retrieve mask during TCAM searching operations.

The foregoing description has been directed to specific embodiments of this invention. It will be apparent, however, that other variations and modifications may be made to the described embodiments, with the attainment of some or all of their advantages. More specifically, pointers to other information, besides messages, may be provided to the traffic shaper 218, stored by the forwarding trigger mechanism 306 and searched in a time-dependent manner. For example, pointers to various transactions or events may be provided to the "traffic shaper" and processed (e.g., timesearched) at high speed. Therefore, it is the object of the appended claims to cover all such variations and modifications as come within the true spirit and scope of the invention.

What is claimed is:

1. A traffic shaper for use in determining transmission start times for network messages, the traffic shaper comprising:
   a plurality of queues for storing information relating to the network messages;
   a queue controller operably coupled to the plurality of queues for storing the information in and retrieving the information from the plurality of queues;
   a scheduler in communicating relationship with the queue controller, the scheduler configured to compute release times for the network messages;
   a memory for storing the computed release times; and
   a memory controller operably coupled to the memory, the memory controller configured to search the memory for computed release times,
   wherein release times are computed and stored in the memory as information relating to the network messages is retrieved from the queues.

2. The traffic shaper of claim 1 wherein the information includes a network message length and a network message pointer.

3. The traffic shaper of claim 1 wherein each network message is associated with a shaper identification (SID) value, and the traffic shaper further comprises a queue control memory accessible by the queue controller, the queue control memory including a mapping of SID values to queues such that the information for a given network message is mapped by the SID value associated with the given message to a specific queue.

4. The traffic shaper of claim 3 wherein the queue control memory further includes data for each queue indicating whether the respective queue is empty.

5. The traffic shaper of claim 4 wherein the scheduler comprises a rate monitor configured to determine a rate at which network messages can be released, and a release timestamp generator for computing release times based on the determined rates.

6. The traffic shaper of claim 5 wherein the determined network message release rates are one of Committed Information Rate (CIR) and Excess Information Rate (EIR) values.

7. The traffic shaper of claim 3 wherein the memory comprises at least one content addressable memory structure for storing computed release times, and corresponding a random access memory structure for storing the SID values associated with the respective release times stored in the content addressable memory structure.

8. The traffic shaper of claim 7 wherein the memory controller comprises a retrieve time generator for producing retrieve times that are used to search the computed release times stored in the content addressable memory structure.

9. The traffic shaper of claim 8 further comprising a current time generator for producing a current time, wherein the retrieve time produced by the retrieve time generator can catch up to but not exceed the current time produced by the current time generator.

10. The traffic shaper of claim 9 wherein upon identifying a release time stored in the content addressable memory that matches the release time produced by the release time generator, the memory controller provides the SID value associated with the matching release time and the current time to the queue controller.

11. The traffic shaper of claim 10 wherein the queue controller, upon receiving a SID value from the memory controller, accesses the queue control memory to identify the queue corresponding to the received SID value, and retrieves the information from the head of identified queue, thereby releasing the corresponding network message from the traffic shaper.

12. The traffic shaper of claim 1 configured to support multiple levels of shaping.

13. A method for shaping network traffic by selectively releasing network messages, the method comprising the steps of:
   providing a plurality of queues for storing data;
   associating each queue with a corresponding shaper identification (SID) value;
   receiving information related to a network message to be shaped, including a SID value;
   storing at least some of the received information at the queue corresponding to the received SID value;
   computing a release time for each queue containing network message information;
   storing the computed release times in a time-searchable memory structure; and
   upon expiration of a computed release time, dequeuing network message information from the queue corresponding to the expired release time.

14. The method of claim 13 wherein a new release time is computed for a given queue in response to the step of dequeuing network message information from the given queue.

15. The method of claim 14 further comprising the step of searching the time searchable memory structure for expired release times.

16. The method of claim 15 wherein the network message information stored at the queues includes a message length and a message pointer.

17. The method of claim 14 further comprising the steps of:
- associating each computed release time stored in the time-searchable memory structure with a corresponding SID value; and
- upon expiration of a computed release time stored in the time-searchable memory structure, using the associated SID value to identify the queue from which network message information is to be dequeued.

18. The method of claim 17 wherein the step of computing a release time comprises the steps of:
- determining, based on a rate at which network messages are being drained, whether an excess information rate (EIR) or a committed information rate (CIR) is to be used in the calculation; and
- computing the release time based on the EIR or CIR as determined.

19. The method of claim 18 wherein the step of determining comprises the steps of:
- computing a level at which network messages are draining from the respective queue;
- comparing the level to a threshold;
- if the new last updated level exceeds the threshold, selecting the CIR; and
- if the new last updated level does not exceed the threshold, selecting the EIR.

20. The method of claim 19 further comprising the step of, upon dequeuing network message information from a first queue in response to an expired release time, enqueuing the network message information at a second queue.

21. A traffic shaper for use in determining transmission start times for network messages, the traffic shaper comprising:
- a plurality of queues for storing information relating to the network messages;
- means for storing the information in and retrieving the information from the plurality of queues;
- means for computing release times for the network messages;
- a memory for storing the computed release times; and
- means for searching the memory for computed release times,
- wherein release times are computed and stored in the memory as information relating to the network messages is retrieved from the queues.

22. The traffic shaper of claim 21 wherein the release time computing means comprises means for determining a rate at which network messages can be released, and the release time computing means computes release times based on the determined rates.

23. The traffic shaper of claim 22 wherein the searching means comprises means for producing retrieve times that are used to search the computed release times stored in the memory.

24. The traffic shaper of claim 23 further comprising means for generating a current time, wherein the retrieve time from the retrieve time producing means can catch up to but not exceed the current time produced by the current time generator.

25. A computer readable medium containing executable program instructions for shaping network traffic by selectively releasing network messages, the executable program instructions comprising program instructions for:
- providing a plurality of queues for storing data;
- associating each queue with a corresponding shaper identification (SID) value;
- receiving information related to a network message to be shaped, including a SID value;
- storing at least some of the received information at the queue corresponding to the received SID value;
- computing a release time for each queue containing network message information;
- storing the computed release times in a time-searchable memory structure; and
- upon expiration of a computed release time, dequeuing network message information from the queue corresponding to the expired release time.

26. The computer readable medium of claim 25 wherein a new release time is computed for a given queue in response to the step of dequeuing network message information from the given queue.

27. The computer readable medium of claim 26 further comprising programming instructions for searching the time searchable memory structure for expired release times.

28. The computer readable medium of claim 27 wherein the network message information stored at the queues includes a message length and a message pointer.

29. The computer readable medium of claim 26 further comprising programming steps for:
- associating each computed release time stored in the time-searchable memory structure with a corresponding SID value; and
- upon expiration of a computed release time stored in the time-searchable memory structure, using the associated SID value to identify the queue from which network message information is to be dequeued.

30. The computer readable medium of claim 29 wherein the programming instruction for computing a release time comprises programming instructions for:
- determining, based on a rate at which network messages are being drained, whether an excess information rate (EIR) or a committed information rate (CIR) is to be used in the calculation; and
- computing the release time based on the EIR or CIR as determined.

31. The computer readable medium of claim 30 wherein the programming instructions for determining comprises the programming instructions for:
- computing a level at which network messages are draining from the respective queue;
- comparing the level to a threshold;
- if the new last updated level exceeds the threshold, selecting the CIR; and
- if the new last updated level does not exceed the threshold, selecting the EIR.

32. The computer readable medium of claim 31 further comprising programming instructions for, upon dequeuing network message information from a first queue in response to an expired release time, enqueuing the network message information at a second queue.

* * * * *